(12) United States Patent
Miller et al.

(10) Patent No.: US 10,702,019 B2
(45) Date of Patent: Jul. 7, 2020

(54) THREE-DIMENSIONAL PRINTING UTILIZING A CAPTIVE ELEMENT

(71) Applicant: NIKE, Inc., Beaverton, OR (US)

(72) Inventors: Todd W. Miller, Portland, OR (US); Yoav Sterman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 512 days.

(21) Appl. No.: 15/370,957

(22) Filed: Dec. 6, 2016

(65) Prior Publication Data

US 2017/0157846 A1 Jun. 8, 2017

Related U.S. Application Data

(60) Provisional application No. 62/263,891, filed on Dec. 7, 2015, provisional application No. 62/263,916, filed (Continued)

(51) Int. Cl.
*A43C 1/06* (2006.01)
*A43B 23/02* (2006.01)
(Continued)

(52) U.S. Cl.
CPC ................. *A43C 1/06* (2013.01); *A43B 3/26* (2013.01); *A43B 13/181* (2013.01); *A43B 13/22* (2013.01); *A43B 23/00* (2013.01); *A43B 23/02* (2013.01); *A43B 23/0245* (2013.01); *A43B 23/042* (2013.01); *A43B 23/24* (2013.01); *A43C 1/00* (2013.01); *A43C 1/04* (2013.01); *A43C 7/00* (2013.01); *A43C 11/16* (2013.01); *B29C 64/00* (2017.08); *B29C 64/106* (2017.08); *B29C 64/112* (2017.08); *B29C 64/30* (2017.08); *B29D 35/12* (2013.01); *B33Y 10/00* (2014.12); *B33Y 80/00* (2014.12); *A43D 2200/60* (2013.01); *B29K 2101/12* (2013.01); *B29K 2995/0082* (2013.01); *B29L 2031/505* (2013.01); *B29L 2031/727* (2013.01)

(58) Field of Classification Search
CPC ........................................................ A43C 1/06
See application file for complete search history.

(56) References Cited

U.S. PATENT DOCUMENTS 5,203,944 A 4/1993 Prinz et al.
5,362,427 A 11/1994 Mitchell, Jr.
(Continued)

FOREIGN PATENT DOCUMENTS

WO WO 2013/154723 10/2013
WO WO 2014/209994 * 12/2014

OTHER PUBLICATIONS

International Search Report and Written Opinion, dated May 26, 2017, for corresponding International Patent Application No. PCT/US2016/065172, 17 pages.

*Primary Examiner* — Larry W Thrower
(74) *Attorney, Agent, or Firm* — Klarquist Sparkman, LLP

(57) ABSTRACT

A method of forming a printed structure is disclosed. The method may include printing layers of a printed structure and incorporating an element within the printed structure. The element may be removed in order to form tunnels within the printed structure. In some embodiments the element may be removed and reused in the formation of additional printed structures. The element may also be retained to form a composite printed structure.

18 Claims, 17 Drawing Sheets

Related U.S. Application Data on Dec. 7, 2015, provisional application No. 62/263,923, filed on Dec. 7, 2015, provisional application No. 62/263,898, filed on Dec. 7, 2015, provisional application No. 62/263,834, filed on Dec. 7, 2015.

(51) Int. Cl.

| | |
|---|---|
| *A43B 23/24* | (2006.01) |
| *A43C 1/04* | (2006.01) |
| *A43C 7/00* | (2006.01) |
| *A43C 11/16* | (2006.01) |
| *A43B 23/04* | (2006.01) |
| *B29C 64/112* | (2017.01) |
| *B29C 64/00* | (2017.01) |
| *B29C 64/106* | (2017.01) |
| *B29C 64/30* | (2017.01) |
| *A43B 23/00* | (2006.01) |
| *A43C 1/00* | (2006.01) |
| *B33Y 10/00* | (2015.01) |
| *B33Y 80/00* | (2015.01) |
| *B29D 35/12* | (2010.01) |
| *A43B 3/26* | (2006.01) |
| *A43B 13/18* | (2006.01) |
| *A43B 13/22* | (2006.01) |
| *B29K 101/12* | (2006.01) |
| *B29L 31/50* | (2006.01) |
| *B29L 31/00* | (2006.01) |

(56) References Cited

U.S. PATENT DOCUMENTS

| | | |
|---|---|---|
| 5,510,066 A | 4/1996 | Fink et al. |
| 2004/0145629 A1 | 7/2004 | Silverbrook |
| 2010/0021638 A1 | 1/2010 | Varanka et al. |

\* cited by examiner

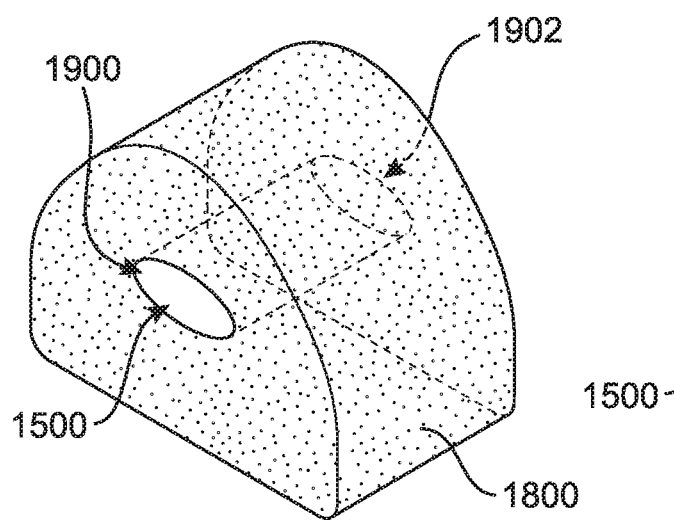
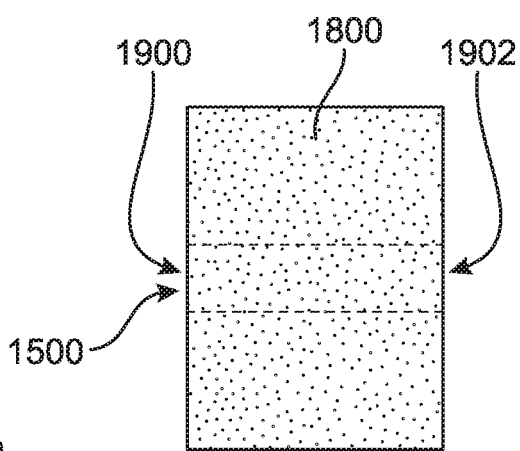
FIG. 19     FIG. 20
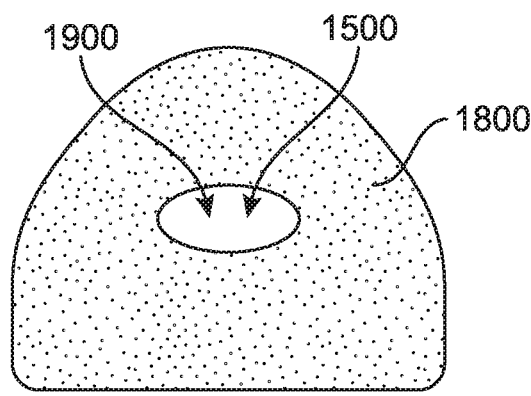
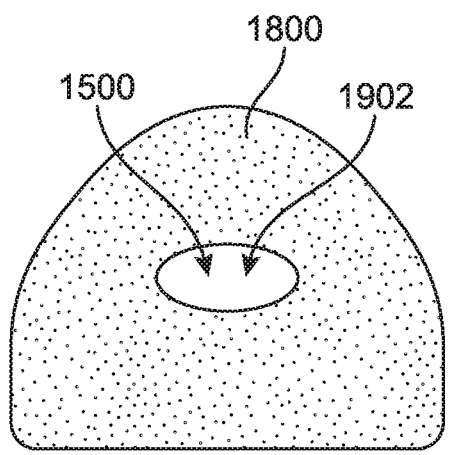
FIG. 21     FIG. 22

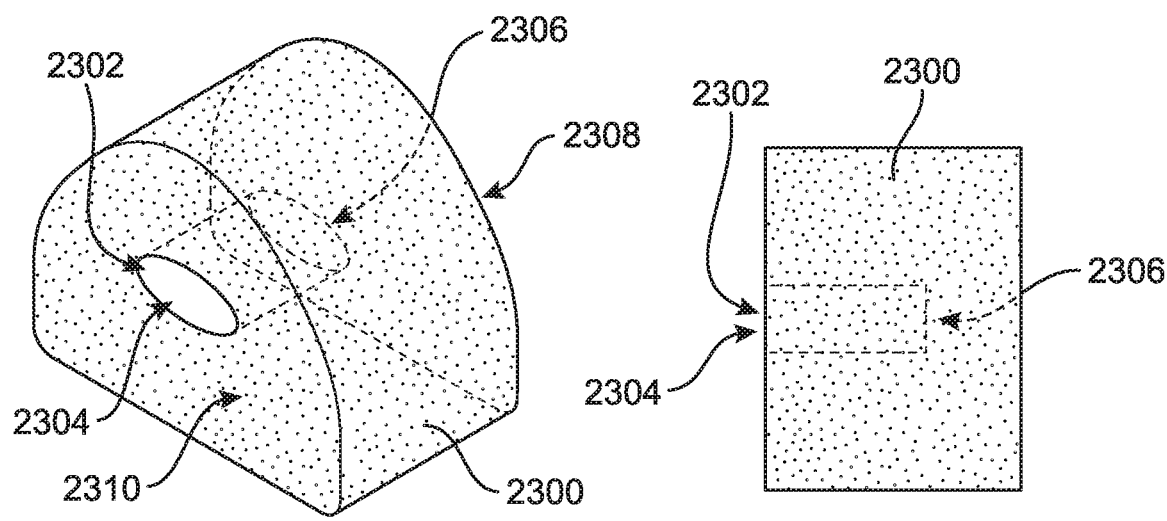
FIG. 23
FIG. 24
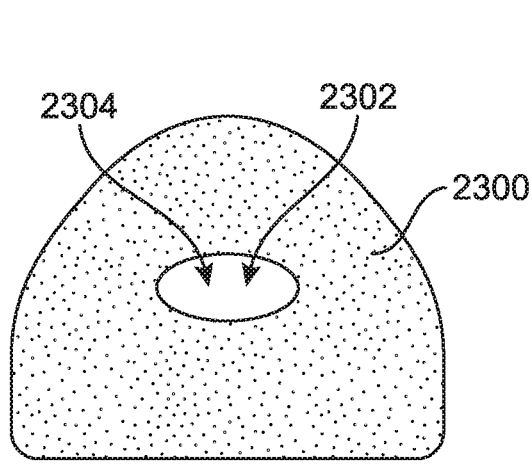
FIG. 25
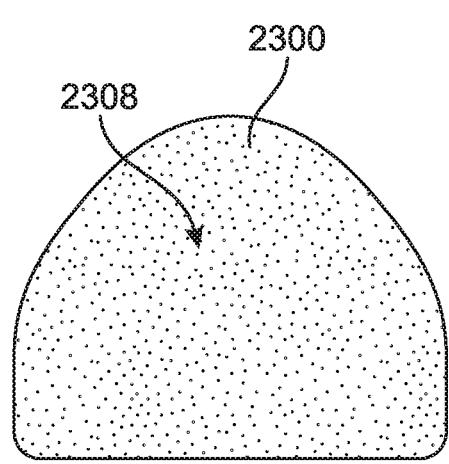
FIG. 26

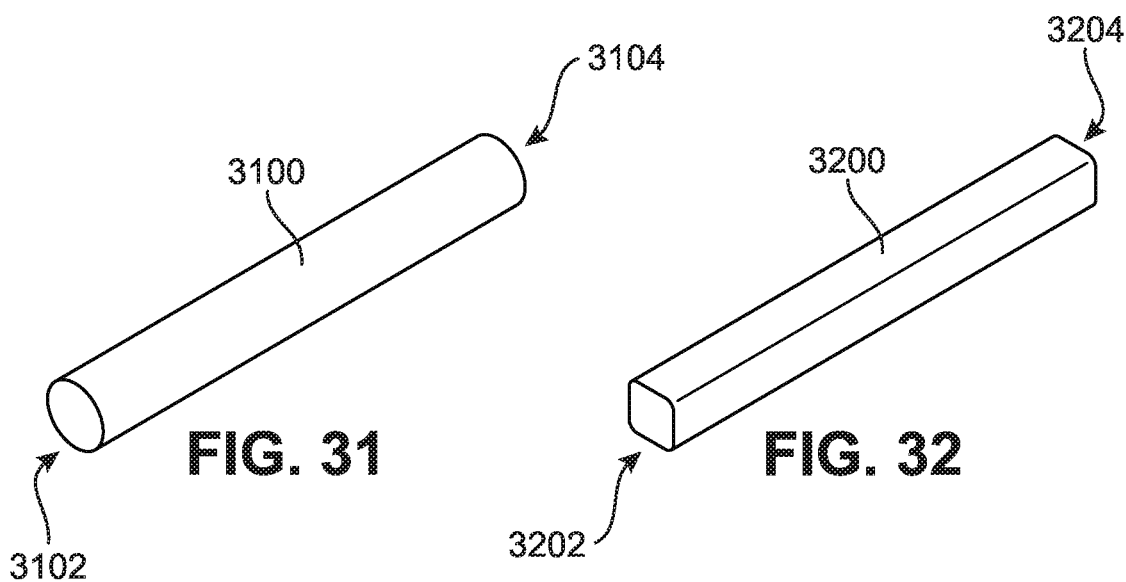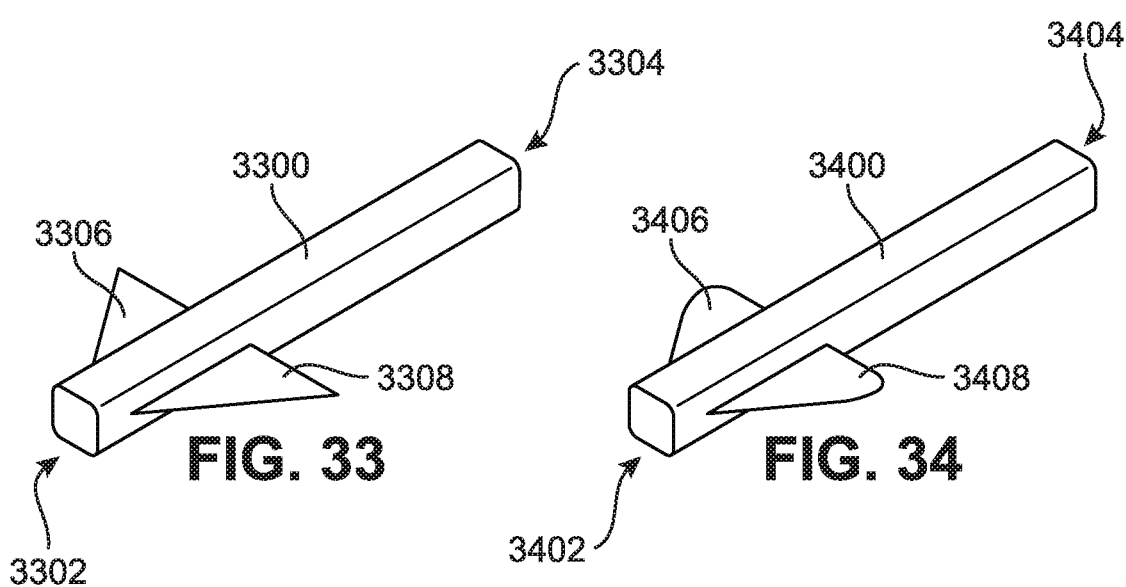

THREE-DIMENSIONAL PRINTING UTILIZING A CAPTIVE ELEMENT

CROSS-REFERENCE TO RELATED APPLICATIONS

This application claims the benefit of U.S. Provisional Application No. 62/263,916, filed on Dec. 7, 2015 and entitled "Article of Footwear with Tubular Structures," U.S. Provisional Application No. 62/263,923, filed Dec. 7, 2015 and entitled "Tunnel Spring Structures," U.S. Provisional Application No. 62/263,898, filed Dec. 7, 2015 and entitled "Article of Footwear with Tubular Structures Having Tab Portions," U.S. Provisional Application No. 62/263,834, filed Dec. 7, 2015 and entitled "Three-Dimensional Printing Utilizing a Captive Element," and U.S. Provisional Application No. 62/263,891, filed Dec. 7, 2015 and entitled "Segmented Tunnels on Articles," the disclosures of which are herein incorporated by reference in their entirety.

BACKGROUND

The present embodiments relate generally to three-dimensional printing systems and methods.

Three-dimensional printing systems and methods may be associated with various technologies including fused deposition modeling (FDM), electron beam freeform fabrication (EBF), selective laser sintering (SLS) as well as other kinds of three-dimensional printing technologies.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 19 is an isometric view of an embodiment of a printed structure;

FIG. 20 is a side view of an embodiment of a printed structure;

FIG. 21 is a front view of an embodiment of a printed structure;

FIG. 22 is a back view of an embodiment of a printed structure;

FIG. 23 is an isometric view of an embodiment of a printed structure;

FIG. 24 is a side view of an embodiment of a printed structure;

FIG. 25 is a front view of an embodiment of a printed structure;

FIG. 26 is a back view of an embodiment of a printed structure;

FIG. 31 is an isometric view of an embodiment of an element with a rounded cross-section;

FIG. 32 is an isometric view of an embodiment of an element with a rectangular cross-section;

FIG. 33 is an isometric view of an embodiment of an element with triangular vanes;

FIG. 34 is an isometric view of an embodiment of an element with rounded vanes;

DETAILED DESCRIPTION

In one embodiment, the present disclosure is directed to a method of printing one or more structures. The method comprises discharging a printed material from a nozzle onto a print surface, forming at least a first layer of a first structure using the printed material, placing an element in the first structure, wherein the element is in contact with the first structure, forming at least a second layer of the first structure using the printed material, and enclosing the element at least partially within the first structure.

In another embodiment, the present disclosure is directed to a method of printing one or more structures. The method comprises discharging a printed material from a nozzle onto a print surface, where the print surface is a surface of the article of apparel, and forming at least a first layer of a first structure using the printed material, where the first layer includes a recess. The method further includes placing an element in the first structure, where the element is disposed at least partially within the recess, forming at least a second layer of the first structure using the printed material, and enclosing the element at least partially within the first structure.

In another embodiment, the present disclosure is directed to a method of printing one or more structures using a printing system. The method comprises discharging a printed material from a nozzle onto a print surface, forming at least a first layer of a first structure using the printed material, and placing an element in the first structure, where the element is in contact with the first structure. The method further includes forming at least a second layer of the first structure using the printed material, enclosing the element at least partially within the first structure, removing the element from the first structure, and forming a tunnel in the first structure, where the tunnel forms a blind-hole aperture in the first structure.

Certain aspects, advantages, and novel features of the embodiments of this disclosure are described herein in the context of various embodiments; however, the disclosed methods, systems, and apparatus are not limited to any specific aspect, feature, or combination thereof. For example, the structures, systems and methods disclosed in different embodiments herein can be combined with one another in various manners, and each can also be combined with the structures, systems and methods disclosed in each of the provisional applications to which this application claims priority.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

Figure 1:
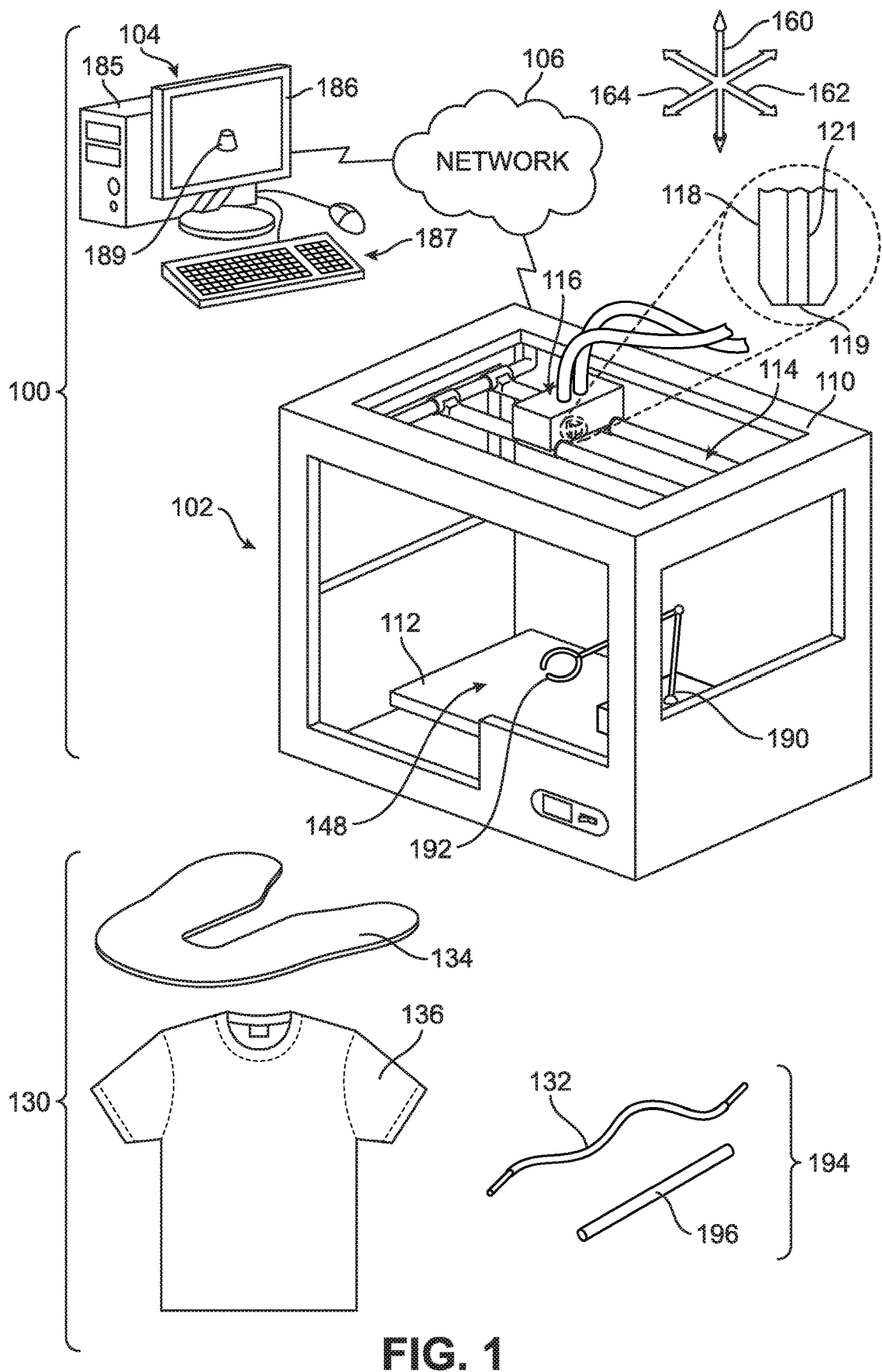
FIG. 1 is a schematic view of an embodiment of components of a three-dimensional printing system as well as several articles that may be used with the three-dimensional printing system.

FIG. 1 is a schematic view of an embodiment of a three-dimensional printing system 100, also referred to simply as printing system 100 hereafter. FIG. 1 also illustrates several exemplary articles 130 that may be used with printing system 100. In addition, FIG. 1 depicts several elements 194 that may be incorporated, placed, or otherwise used during printing. Referring to FIG. 1, printing system 100 may further comprise a printing device 102, a computing system 104, and a network 106.

Structures may be formed and attached to an article using an additive manufacturing process, also referred to as three-dimensional printing (or simply "printing" hereafter). The term "additive manufacturing," also referred to as "three-dimensional printing," refers to any device and technology for making a three-dimensional object through an additive process where layers of material are successively laid down under the control of a computer. Exemplary additive manufacturing techniques that could be used include, but are not limited to, extrusion methods such as fused deposition modeling (FDM), electron beam freeform fabrication (EBF), direct metal laser sintering (DMLS), electron beam melting (EBM), selective laser melting (SLM), selective heat sintering (SHS), selective laser sintering (SLS), plaster-based 3D printing, laminated object manufacturing (LOM), stereolithography (SLA), and digital light processing (DLP). In one embodiment, an additive manufacturing device could be a fused deposition modeling type printer configured to print thermoplastic materials such as acrylonitrile butadiene styrene (ABS) or polyactic acid (PLA).

Additive manufacturing processes may be used to form structures on flat receiving surfaces as well as on contoured or non-flat surfaces. For example, some embodiments depicted in the figures may illustrate methods whereby material is printed onto a flattened surface of an article, such as a material section of an upper that has a flat or unassembled configuration. In such cases, printing material onto the surface may be accomplished by depositing material in thin layers that are also flat. Thus, a print head or nozzle may move in one or more horizontal directions to apply an Nth layer of material and then move in the vertical direction to begin forming the N+1 layer. However, it should be understood that in other embodiments material could be printed onto a contoured or non-flat surface. For example, material could be printed onto a three-dimensional last, where the surface of the last is not flat. In such cases, the printed layers applied to the surface may also be contoured. In order to accomplish this method of printing, a print head or nozzle may be configured to move along a contoured surface and tilt, rotate or otherwise move so that the print head or nozzle is always aligned approximately normal to the surface where printed material is being applied. In some cases, a print head could be mounted to a robotic arm, such as an articulated robotic arm with six degrees of freedom. Alternatively, in still other embodiments, an object with a contoured surface could be re-oriented under a nozzle so that contoured layers of printed material could be applied to the object. For example, embodiments could make use of any of the systems, features, components and/or methods disclosed in Mozeika et al., U.S. Patent Publication Number 2013/0015596, published Jan. 17, 2013 (and filed as U.S. application Ser. No. 13/530,664 on Jun. 22, 2012), titled "Robotic fabricator," the entirety of which is herein incorporated by reference. Embodiments could also make use of any of the systems, features, components and/or methods disclosed in Cannell et al., U.S. Pat. No. 8,123,350, issued Feb. 28, 2012, titled "Computerized apparatus and method for applying graphics to surfaces," the entirety of which is herein incorporated by reference. Thus, it may be appreciated that the present embodiments are not limited to printing processes used for printing to flat surfaces and may be used in conjunction with printing systems that can print to any kinds of surfaces having any kinds of geometry.

For consistency and convenience, directional adjectives are employed throughout this detailed description corresponding to the illustrated embodiments. The term "longitudinal," as used throughout this detailed description and in the claims, refers to a direction extending a length of a component. The term "longitudinal axis," as used throughout this detailed description and in the claims, refers to an axis oriented in a longitudinal direction.

The term "lateral direction," as used throughout this detailed description and in the claims, refers to a side-to-side direction extending a width of a component. For example, the lateral direction may extend between a medial side and a lateral side of an article of footwear, with the lateral side of the article of footwear being the surface that faces away from the other foot, and the medial side being the surface that faces toward the other foot. The term "lateral axis," as used throughout this detailed description and in the claims, refers to an axis oriented in a lateral direction.

The term "horizontal," as used throughout this detailed description and in the claims, refers to any direction substantially parallel with the longitudinal direction, the lateral direction, and all directions in between. In cases where a component is placed on the ground, a horizontal direction may be parallel with the ground.

The term "vertical," as used throughout this detailed description and in the claims, refers to a direction generally perpendicular to both the lateral and longitudinal directions, along a vertical axis. For example, in cases where a component is flat on a ground surface, the vertical direction may extend from the ground surface upward.

It will be understood that each of these directional adjectives may be applied to individual components of a sole. Furthermore, the term "outer surface" as used throughout this detailed description and in the claims, refers to the surface of a component that would be facing away from the foot when worn by a wearer. "Inner surface," or "inner side" as used throughout this detailed description and in the claims, refers to the surface of a component that is facing inward, or the surface that faces toward the foot when worn by a wearer.

For purposes of this disclosure, the foregoing directional terms, when used in reference to an article of footwear or another article of apparel, shall refer to the article of footwear when sitting in an upright position, with the sole facing groundward, that is, as it would be positioned when worn by a wearer standing on a substantially level surface.

In the embodiments shown in the figures, printing system 100 may be associated with fused filament fabrication (FFF), also referred to as fused deposition modeling. An example of a printing device using fused filament fabrication (FFF) is disclosed in Crump, U.S. Pat. No. 5,121,329, filed Oct. 30, 1989 and titled "Apparatus and Method for Creating Three-Dimensional Objects," which application is herein incorporated by reference and referred to hereafter as the "3D Objects" application. Embodiments of the present disclosure can make use of any of the systems, components, devices, and methods disclosed in the 3D Objects application.

Printing device 102 may include a housing 110 that supports various systems, devices, components or other provisions that facilitate the three-dimensional printing of objects (e.g., parts, components, or structures). Although the exemplary embodiment depicts a particular rectangular box-like geometry for housing 110, other embodiments could use any housing having any geometry and/or design. The shape and size of housing 110 could be varied according to factors including a desired foot-print for the device, the size and shape of parts that may be formed within printing device 102, as well as possibly other factors. It will be understood that housing 110 could be open (e.g., provide a frame with large openings) or closed (e.g., with glass or panels of solid material and a door).

In some embodiments, printing device 102 may include provisions to retain or hold a printed object (or a component supporting the printed object). In some embodiments, printing device 102 may include a table, platform, tray or similar component to support, retain and/or hold a printed object or an object onto which printed material is being applied. In the embodiment of FIG. 1, printing device 102 includes a tray 112. In some embodiments, tray 112 may be fixed in place and act as a stable base. In other embodiments, however, tray 112 could move. For example, in some cases, tray 112 may be configured to translate within housing 110 in a horizontal direction (e.g., front-back and/or left right with respect to housing 110) as well as a vertical direction (e.g., up-down within housing 110). Moreover, in some cases, tray 112 may be configured to rotate and/or tilt about one or more axes associated with tray 112. Thus it is contemplated that in at least some embodiments, tray 112 may be moved into any desired relative configuration with a nozzle or print head of printing device 102. In other embodiments, printing device 102 may not include a tray 112. In some embodiments, tray 112 may be curved, irregularly shaped, or shaped to provide a customized platform upon which an article or object may be placed or secured. In some embodiments, printing device 102 may include an open space or cavity formed within tray 112.

In some embodiments, printing device 102 may include one or more systems, devices, assemblies or components for delivering a printed material (or printed substance) to a target location. Target locations could include the surface of tray 112, a surface or portion of a partially printed structure and/or a surface or portion of a non-printed structure or component. The target location may also be referred to as a print surface 148. In different embodiments, provisions for delivering printed materials include, for example, print heads and nozzles. In the embodiment of FIG. 1, printing device 102 includes a nozzle assembly 116.

Nozzle assembly 116 may comprise one or more nozzles that deliver a printed material to a target location. For purposes of clarity, the exemplary embodiment of FIG. 1 depicts a single nozzle 118 of nozzle assembly 116. However, in other embodiments, nozzle assembly 116 could be configured with any number of nozzles, which could be arranged in an array or any particular configuration. In embodiments comprising two or more nozzles, the nozzles could be configured to move together and/or independently.

Nozzle 118 may be configured with a nozzle aperture 119 that can be opened and/or closed to control the flow of material exiting from nozzle 118. Specifically, nozzle aperture 119 may be in fluid communication with a nozzle channel 121 that receives a supply of material from a material source (not shown) within printing device 102. Some examples of materials that may be received or used are disclosed in Sterman et al., U.S. patent application Ser. No. 14/935,731, filed Nov. 9, 2015 and titled "Tack and Drag Printing Method," which application is herein incorporated by reference in its entirety, hereinafter referred to as the "Tack and Drag" case.

In some embodiments, a worm-drive may be used to push the filament into nozzle 118 at a specific rate (which may be varied to achieve a desired volumetric flow rate of material from nozzle 118). In other embodiments, a worm-drive is omitted. For example, the material may be pulled from nozzle 118 using an actuating system. It will be understood that in some cases, the supply of material could be provided at a location near nozzle 118 (e.g., in a portion of nozzle assembly 116), while in other embodiments the supply of material could be located at some other location of printing device 102 and fed via tubes, conduits, or other provisions, to nozzle assembly 116.

As will be described below, printing system 100 can include provisions for facilitating the alignment of a printed design or graphic onto an article. In some embodiments, it may be useful to provide a user with a way of aligning an article with printing system 100 so as to ensure a graphic is printed in the desired portion of the article. In particular, printing system 100 may include provisions for programming the orientation of an article with print device 102 in such a way as to accommodate articles of various types, shapes, curves, and sizes.

In some embodiments, nozzle assembly 116 is associated with a first actuating system 114. First actuating system 114 may include various components, devices and systems that facilitate the motion of nozzle assembly 116 within housing 110. In particular, first actuating system 114 may include provisions to move nozzle assembly 116 in any horizontal direction. Horizontal directions can include longitudinal directions, referred to herein as a third direction 164, and/or lateral directions, also referred to herein as a second direction 162, or any other direction lying along the horizontal plane. First actuating system 114 may also include provisions to move nozzle assembly 116 in any vertical direction, identified herein as a first direction 160. The movement of nozzle assembly 116 in various directions can facilitate the process of depositing a material so as to form a three-dimensional object or to print along a three-dimensional or curved surface. To this end, embodiments of first actuating system 114 may include one or more tracks, rails, and/or similar provisions to hold nozzle assembly 116 at various positions and/or orientations within housing 110. Embodiments may also include any kinds of motors, such as a stepper motor or a servo motor, to move nozzle assembly 116 along a track or rail, and/or to move one or more tracks or rails relative to one another.

For purposes of this description, an object or article with a curved surface refers to articles 130 with one or more portions that include curves, bumps, and varying thickness. For example, an article may have regions that are flat, smooth, level, or even, with relatively little thickness. However, the same article may also include curved regions with surfaces that deviate from being straight for some or all of its length or area. In some embodiments, curved surfaces can comprise regular, geometric curves such as those associated with circles, triangles, squares, and other geometric shapes, and/or they may also be irregular, for example in articles shaped to accommodate or include a particular uneven configuration.

An actuating system can be configured to move a nozzle in one or more directions. In some embodiments, an actuating system could move a nozzle in a single linear direction. In other embodiments, an actuating system could move a nozzle in at least two perpendicular directions. In still other embodiments, an actuating system could move a nozzle in three perpendicular directions. For example, in the exemplary embodiment shown in FIG. 1, first actuating system 114 may be configured to move nozzle 118 in first direction 160, second direction 162 and third direction 164. As seen in FIG. 1, first direction 160 may be associated with a vertical direction of housing 110, while second direction 162 and third direction 164 may be associated with horizontal directions of housing 110 (e.g., length and width directions). Of course while the exemplary embodiment depicts an actuating system capable of moving a nozzle through three independent x-y-z or Cartesian directions, other embodiments may be configured to move a nozzle in three independent directions associated with a non-Cartesian coordinate system (e.g., a spherical coordinate system, a cylindrical coordinate system, etc.). Still further, in other cases an actuating system could move a nozzle through three different directions that may not be orthogonal (e.g., directions of an oblique coordinate system).

In certain embodiments, first direction 160 is approximately normal to a surface, such as a print surface 148. As used herein, a direction is approximately normal to a surface when it is within 10 degrees from perpendicular to the surface. For example, as shown, first direction 160 is approximately normal to print surface 148.

For purposes of this discussion, a print surface may correspond to the surface where a nozzle is printing. For example, in cases where nozzle 118 prints directly onto tray 112, the print surface is associated with a surface of tray 112. In the embodiment of FIG. 1, print surface 148 is illustrated as the side of tray 112 that faces upward toward nozzle assembly 116. However, it should be noted that in other embodiments, print surface 148 may comprise the surface or side of an article or object that is printed upon by nozzle 118. Print surface 148 may be generally flat, or it may be substantially curved and include contours. In one embodiment, print surface 148 may be the side or surface of an object or article that is generally normal to first direction 160. Thus, print surface 148 may refer to the surface of an article that is attached to a printing material such as a thread or other material extruded or otherwise discharged or emitted from nozzle 118.

In certain embodiments, printing system 100 can selectively move nozzle 118. In one embodiment, printing system 100 simultaneously moves nozzle 118 in three directions. For example, printing system 100 may move nozzle 118 in first direction 160 away from tray 112 while simultaneously moving nozzle 118 in second direction 162 and/or in third direction 164 over print surface 148. In another example, a position along a direction is maintained while printing system 100 selectively moves nozzle 118 in another direction. Printing system 100 may move nozzle 118 in first direction 160 to or away from print surface 148 while simultaneously maintaining a base position of nozzle 118 in second direction 162 and in third direction 164 over print surface 148. In another example, printing system 100 may maintain a print distance 216 (see FIG. 2) from nozzle 118 in first direction 160 while simultaneously moving nozzle 118 parallel to print surface 148.

Figure 2:
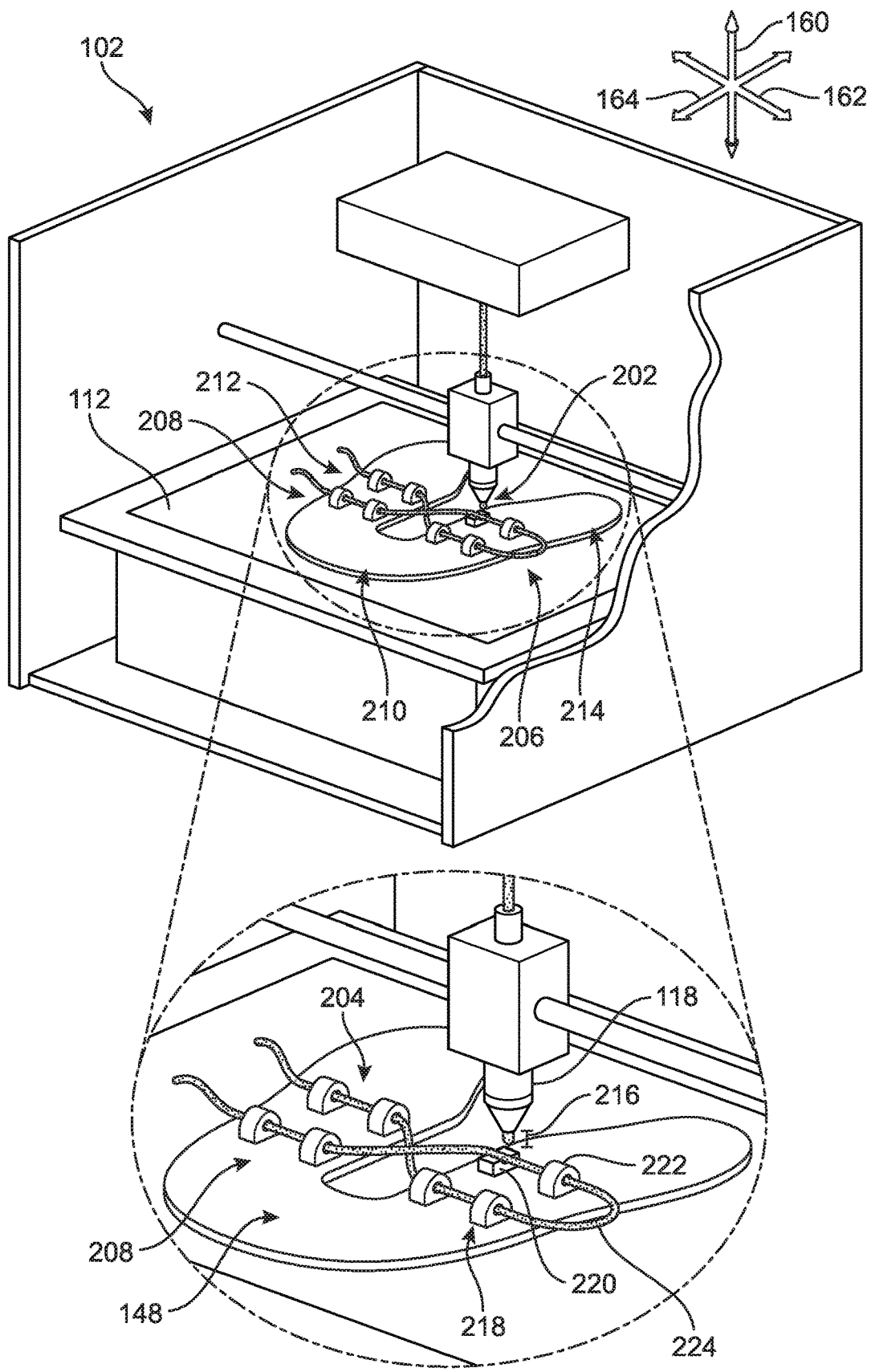
FIG. 2 is a schematic view of an embodiment of a printing device and a base.

For purposes of this description, print distance 216 (as shown in FIG. 2) refers to the distance or height in the vertical direction between nozzle 118 and print surface 148. Thus, in some embodiments, as print surface 148 may be curved or otherwise vary in height, print distance 216 may increase or decrease without any corresponding vertical motion of nozzle 118 when nozzle moves in the horizontal plane. In other words, print distance 216 may change even though the distance between nozzle 118 and tray 112 remains constant due to the contoured geometry of an underlying article. In other embodiments, print distance 216 may remain constant as nozzle 118 moves in the horizontal plane. In one embodiment, due to a vertical motion of nozzle 118, the distance between nozzle 118 and tray 112 may vary while nozzle 118 maintains a constant print distance 216 relative to print surface 148. Thus, printing system 100 can maintain a generally constant distance between nozzle 118 and print surface 148, which can facilitate printing directly to objects with some curvature and/or surface texture.

In order to improve the efficiency of printing system 100, in different embodiments, one or more elements 194 can be associated with a second actuating system 190 that may be included in printing system 100. Although the exemplary embodiment generally depicts a rectangular box-like geometry for second actuating system 190, other embodiments could use any system having any geometry and/or design. The shape and size of the actuating system could be varied according to factors including the article being printed on, the size, shape and dimension of parts that may be formed within printing device 102, as well as possibly other factors.

Second actuating system 190 may include various components, devices and systems that facilitate the motion of elements 194 within housing 110. In particular, second actuating system 190 may include provisions to move elements 194 in any horizontal direction and/or vertical direction to facilitate the position of elements 194 during printing. To this end, embodiments of second actuating system 190 may include one or more tracks, rails, and/or similar provisions to hold elements 194 at various positions and/or orientations within housing 110. Embodiments may also include any kinds of motors, such as a stepper motor or a servo motor, to move elements 194 along a track or rail, and/or to move one or more tracks or rails relative to one another.

In some embodiments, there may be a securing device 192, such as a clamp or other adjustable gripping member, in second actuating system 190. Securing device 192 can provide a means of attachment between second actuating system 190 and elements 194. In other embodiments, there may be no securing device 192. It should be noted that portions of second actuating system 190 may be positioned in various locations within printing system 100. In one embodiment, second actuating system 190 may include provisions for removing elements 194 from printed structures.

Thus, second actuating system 190 can be configured to move an element in one or more directions. In some embodiments, an actuating system could move an element in a single linear direction. In other embodiments, an actuating system could move an element in at least two perpendicular directions. In still other embodiments, an actuating system could move an element in three perpendicular directions. For example, in the exemplary embodiment shown in FIG. 1, second actuating system 190 may be configured to move elements 194 in a first direction 160, a second direction 162 and a third direction 164. As seen in FIG. 1, first direction 160 may be associated with a vertical direction of housing 110, while second direction 162 and third direction 164 may be associated with horizontal directions of housing 110 (e.g., length and width directions). Of course while the exemplary embodiment depicts an actuating system capable of moving an element through three independent x-y-z or Cartesian directions, other embodiments may be configured to move an element in three independent directions associated with a non-Cartesian coordinate system (e.g., a spherical coordinate system, a cylindrical coordinate system, etc.). Still further, in other cases an actuating system could move an element through three different directions that may not be orthogonal (e.g., directions of an oblique coordinate system).

In certain embodiments, printing system 100 may selectively move the element using second actuating system 190 or another mechanism. In one embodiment, printing system 100 simultaneously moves elements 194 in three directions. For example, printing system 100 may move elements 194 in first direction 160 away from tray 112 while simultaneously moving elements 194 in second direction 162 and/or in third direction 164 in a direction generally parallel to tray 112. In other embodiments, a position along a direction is maintained while printing system 100 selectively moves elements 194 in another direction. In certain embodiments, printing system 100 may move elements 194 in first direction 160 to or away from tray 112 while simultaneously maintaining a base position of elements 194 in second direction 162 and in third direction 164 along print surface 148. In some embodiments, printing system 100 may maintain a print distance 216 from elements 194 in first direction 160 while simultaneously moving elements 194 parallel to print surface 148. For example, printing system 100 may maintain a print distance 216 from elements 194 in first direction 160 while simultaneously moving elements 194 in second direction 162 and/or third direction 164.

In some embodiments, first actuating system 114 and/or second actuating system 190 can be operated manually by a user. In other embodiments, there may be provisions for automating the operation of first actuating system 114 and second actuating system 190. For example, some embodiments could include motors and/or other provisions for automatically driving nozzle 118 to various positions along one or more tracks. Moreover, in automated embodiments, the position or speed of nozzle 118 and/or elements 194 could be adjusted using controls provided in printing system 100, or using an associated system, such as computing system 104, which is discussed in further detail below.

It will be understood that for purposes of illustration, the components, devices and systems of printing device 102 are shown schematically in FIG. 1. It will therefore be appreciated that embodiments may include additional provisions not shown, including specific parts, components and devices that facilitate the operation of first actuating system 114, second actuating system 190, and nozzle assembly 116. For example, first actuating system 114 is shown schematically as including several tracks or rails, but the particular configuration and number of parts comprising first actuating system 114 may vary from one embodiment to another.

As discussed above, printing system 100 can include provisions to control and/or receive information from printing device 102. These provisions can include a computing system 104 and a network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some cases, a print server may be primarily responsible for controlling and/or communicating with printing device 102, while a separate computer (e.g., desktop, laptop or tablet) may facilitate interactions with a user. Computing system 104 can also include one or more storage devices including but not limited to magnetic, optical, magneto-optical, and/or memory, including volatile memory and non-volatile memory.

In the exemplary embodiment of FIG. 1, computing system 104 may comprise a central processing device 185, a viewing interface 186 (e.g., a monitor or screen), input devices 187 (e.g., keyboard and mouse), and software for designing a computer-aided design ("CAD") representation 189 of a printed structure. In at least some embodiments, the CAD representation 189 of a printed structure may include not only information about the geometry of the structure, but also information related to the materials required to print various portions of the structure.

In some embodiments, computing system 104 may be in direct contact with printing device 102 via network 106. Network 106 may include any wired or wireless provisions that facilitate the exchange of information between computing system 104 and printing device 102. In some embodiments, network 106 may further include various components such as network interface controllers, repeaters, hubs, bridges, switches, routers, modems and firewalls. In some cases, network 106 may be a wireless network that facilitates wireless communication between two or more systems, devices and/or components of printing system 100. Examples of wireless networks include, but are not limited to: wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

Printing system 100 may be operated as follows to provide one or more structures that have been formed using a 3D printing, or additive, process. Computing system 104 may be used to design a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

Before printing, an article may be placed onto tray 112 or may be secured using second actuating system 190. Once the printing process is initiated (by a user, for example), printing device 102 may begin depositing material onto the article. This may be accomplished by moving nozzle 118 (using first actuating system 114) to build up layers of a structure using deposited material. In embodiments where fused filament fabrication is used, material extruded from nozzle 118 may be heated so as to increase the pliability of the heat moldable material as it is deposited.

Although some of the embodiments shown in the figures depict a system using fused filament fabrication printing technologies, it will be understood that still other embodiments could incorporate one or more different 3D printing technologies. For example, printing system 100 may use a tack and drag print method, as described in the Tack and Drag case. Moreover, still other embodiments could incorporate a combination of fused filament fabrication and another type of 3D printing technique to achieve desired results for a particular printed structure or part.

In different embodiments, printing device 102 may use a variety of different materials for forming 3D parts, including, but not limited to: thermoplastics (e.g., polyactic acid and acrylonitrile butadiene styrene), high density polyethylene, eutectic metals, rubber, clays (including metal clays), Room Temperature Vulcanizing silicone (RTV silicone), porcelain, as well as possibly other kinds of materials known in the art. In embodiments where two or more different printed or extruded materials are used to form a part, any two or more of the materials disclosed above could be used. In some embodiments, printing device 102 may extrude, discharge or use a material or thread composition as described in Sterman et al., U.S. Patent Publication Number 2016/0053410 (U.S. patent application Ser. No. 14/466,319, filed Aug. 22, 2014) and titled "Thread Structure Composition and Method of Making," the disclosure of which is hereby incorporated by reference in its entirety, and is hereinafter referred to as the "Thread Structure Composition" case.

Furthermore, additive printing systems used with the embodiments can make use of any printable materials. The term "printable material" or "print material" is intended to encompass any materials that may be printed, ejected, emitted, or otherwise deposited during an additive manufacturing process. Such materials can include, but are not limited to, thermoplastics (e.g., PLA and ABS) and thermoplastic powders, high-density polyurethylene, eutectic metals, rubber, modeling clay, plasticine, RTV silicone, porcelain, metal clay, ceramic materials, plaster, and photopolymers, as well as possibly other materials known for use in 3D printing.

As discussed above, in some embodiments, printed structures may be printed directly onto one or more articles 130, or a portion of articles 130. The term "articles" is intended to include articles of apparel (e.g., shirts, pants, footwear, etc.), as well as other objects, textiles, or materials. As used throughout this disclosure, the terms "article of footwear" and "footwear" include any footwear and any materials associated with footwear, including an upper, lacing elements, and sole structures, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots. In the embodiment of FIG. 1, articles 130 comprise exemplary articles that may receive a printed structure directly from printing device 102, including an upper 134 or a shirt 136.

Furthermore, while the disclosed embodiments are described in the context of footwear, the disclosed embodiments may further be equally applied to any article of apparel or equipment that may receive 3D printing. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. Other examples of articles include, but are not limited to: shin guards, knee pads, elbow pads, shoulder pads, as well as any other type of protective equipment. Additionally, in some embodiments, the article could be another type of article that is not configured to be worn, including, but not limited to: balls, bags, purses, backpacks, as well as other articles that may not be worn.

In order to apply printed materials directly to one or more articles, printing device 102 may be capable of printing onto the surfaces of various kinds of materials. Specifically, in some cases, printing device 102 may be capable of printing onto the surfaces of various materials such as a textile, a natural fabric, a synthetic fabric, a knit, a woven material, a nonwoven material, a mesh, a leather, a synthetic leather, a polymer, a rubber, and a foam, or any combination of them, without the need for a release layer interposed between a substrate and the bottom of the printed material, and without the need for a perfectly or near-perfectly flat substrate surface on which to print. For example, the disclosed methods may include printing a resin, acrylic, thermoplastic material or ink material onto a fabric, for example a knit material, where the material is adhered/bonded to the fabric and where the material does not generally delaminate when flexed, rolled, worked, or subject to additional assembly processes/steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, and foam.

Although some embodiments may use printing device 102 to print structures directly onto the surface of a material, other embodiments may include steps of printing a structure onto a tray or release paper, and then joining the printed structure to an article in a separate step. In other words, in at least some embodiments, printed structures need not be printed directly to the surface of articles 130.

Furthermore, in some embodiments, printing device 102 may be configured to print one or more structures that incorporate or utilize one or more elements 194 (for example, elements may be placed within or along the printed structure). Elements 194 comprise exemplary elements that may be inserted, disposed, laid adjacent to, placed in contact with, or otherwise incorporated into at least a portion of a printed structure. In some embodiments, elements 194 may include a lacing element 132 or a shaft 196. Elements 194 may also include other objects or substrates which can vary in size, dimension, geometry, material composition, rigidity, texture and other properties. An element for purposes of this disclosure may include but are not limited to cords, cables, laces, shafts, cylinders, tubes, strands, wire, or any other object or material that can be disposed adjacent to printed materials or a printed structure. Elements 194 will be discussed in detail further below.

As previously noted, printing device 102 may be configured to print directly onto various articles 130. For example, as shown in FIG. 2, a first article 204 is depicted. First article 204 comprises an unassembled upper for an article of footwear. In FIG. 2, first article 204 includes a forefoot region 210, a midfoot region 212, and a heel region 214, as described above. Furthermore, first article 204 includes a lateral side 206 and a medial side 208. In other embodiments, first article 204 can include any type of surface, object, or material. In some embodiments, first article 204 may be an upper or a shirt, for example. In the exemplary embodiment of FIG. 2, first article 204 is a portion of an upper. For purposes of this description, the surface of the article or material upon which printing occurs will be referred to as print surface 148.

As previously mentioned, nozzle 118 is configured to emit, discharge, or extrude various materials. In different embodiments, the printed material may be discharged, ejected or otherwise emitted via nozzle 118 in the form of droplets 202. One of ordinary skill in the art will recognize that the form of droplets 202 may vary depending on the actual material ejected or otherwise emitted from nozzle 118. In some embodiments, droplets 202 may thus be any viscosity liquid material, or even a semi-solid material. Consistent with an embodiment, droplets 202 may be any desired material or phase of material suitable for use in printing system 100. In some embodiments, the nozzle system employed may be equivalent or identical to that used in inkjet printing systems, such as piezo inkjet systems. Thus, in some other embodiments, a nozzle may be associated with a piezoelectric inkjet head.

It should be noted that in other embodiments, nozzle 118 may extrude other materials. For example, nozzle 118 may extrude a continuous thread or discrete thread segments. Such a thread may include a composition as described in Thread Structure Composition and Method of Making.

As will be described further below, in different embodiments, various structures may be printed along first article 204. For example, in FIG. 2, a first structure 220 is being completed along lateral side 206 of midfoot region 212 of first article 204. A second structure 222 is adjacent to first structure 220. In some embodiments, printed structures 218 may integrate or otherwise be associated with an element 224. This can be seen in FIG. 2, where element 224 comprising a length of lace is disposed along midfoot region 212 of first article 204. In some embodiments, element 224 may be inserted or be joined to printed structures 218. In one embodiment, element 224 may be placed onto print surface 148 using second actuating system 190 (described with reference to FIG. 1).

In FIG. 2, element 224 is shown as looped through printed structures 218, whereby each printed structure 218 has an opening or tunnel through which element 224 is incorporated or placed. It should be noted that the openings or tunnels need not be round.

First structure 220 in FIG. 2 is shown with a portion of element 224 disposed upon part of its surface. In some embodiments, as printing continues, one or more portions of element 224 may be enclosed or partially enclosed within first structure 220. Some embodiments of this process will be described in further detail below. For purposes of this description, an element is enclosed or partially enclosed when it is in contact with the printed structure along an upper side or surface. In other words, an element is partially enclosed when the element has had printed material deposited to at least partially cover the element, and/or is at least partially contacting the printed structure. An element is fully enclosed when the element is encapsulated or made "captive" within the structure, and the entire surface area of the element is located within the printed structure. In other words, an element that is fully enclosed has no portion or surface area exposed.

In the figures that follow, a portion of printing system 100 is depicted. For purposes of convenience, some components of printing system 100 are not shown. It should be understood that FIGS. 3-38 are for purposes of illustration only, and the components described above with respect to FIGS. 1 and 2 may be included or referred to in the following description while not illustrated in the figures.

FIGS. 3-10 provide a partial view of printing device 102, illustrating a method of printing a three-dimensional structure including various openings or other designs within the interior of the printed structure through the utilization of an element. The methods illustrated herein may be implemented on various devices, may utilize various materials, use different types of bases, etc. Accordingly, the methods illustrated in FIGS. 3-10 are for illustrative purposes only. In some embodiments, the printing can occur over print surfaces 148 that have been previously manufactured or fabricated, or partially manufactured, and printing can occur post-manufacture. This can allow customization of articles 130 to be processed more quickly, as well as more cost-efficiently.

In the exemplary embodiment shown in FIGS. 3-10, structures are shown being printed directly onto a tray of a printing system for purposes of clarity. It may be appreciated, however, that in some cases structures can be printed directly onto the base layer of an article (e.g., an upper or other apparel).

Figure 3:
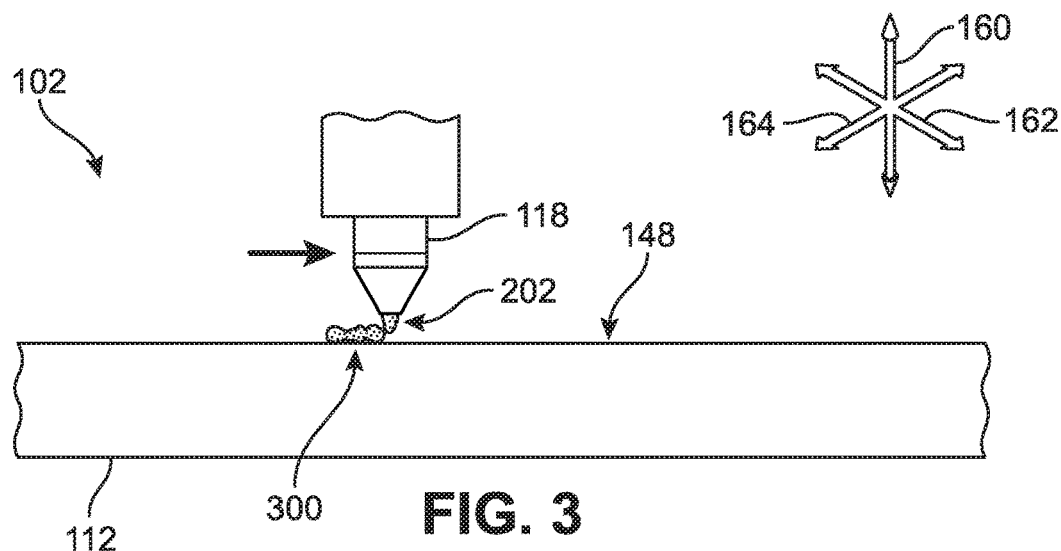
FIG. 3 is a schematic view of an embodiment of a portion of a printing device during operation.
Figure 4:
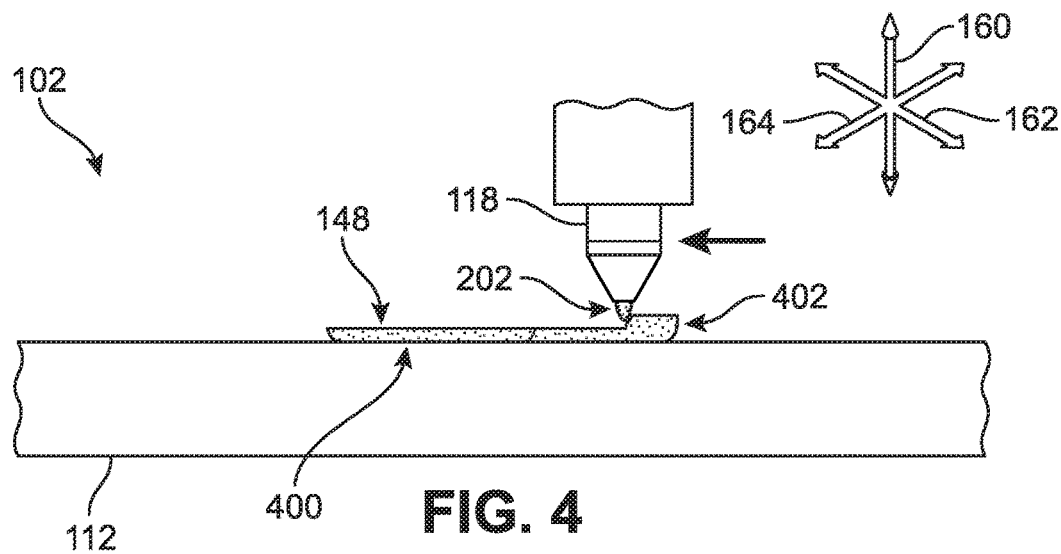
FIG. 4 is a schematic view of an embodiment of a portion of a printing device during operation.
Figure 5:
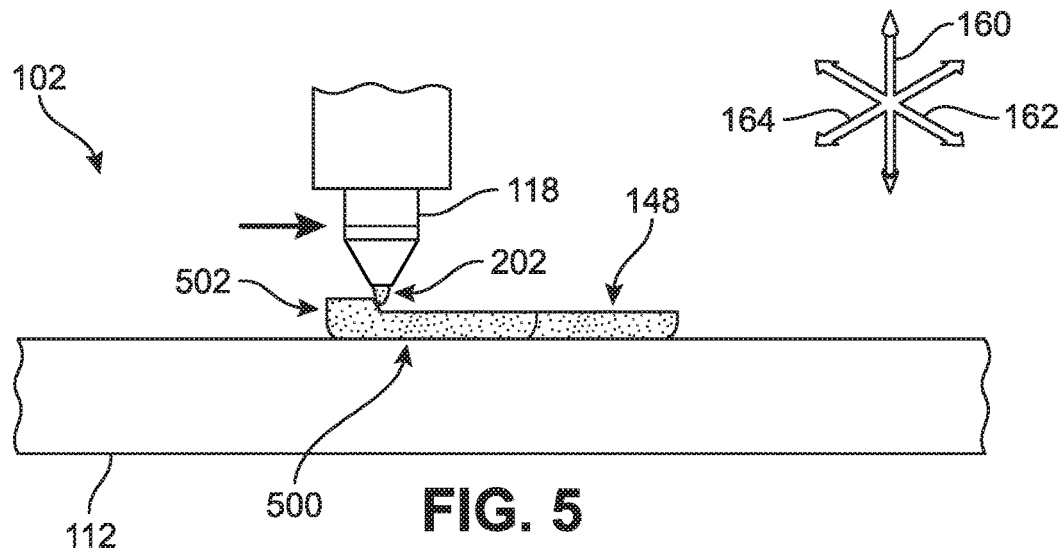
FIG. 5 is a schematic view of an embodiment of a portion of a printing device during operation.

For example, in FIG. 3, a portion of a printing device 102 is depicted. Droplets 202 are being deposited by nozzle 118 onto print surface 148 of tray 112. In FIG. 3, printed material 300 comprising multiple droplets 202 is beginning to coalesce. In FIG. 4, a first layer 400 has been formed by droplets 202. Nozzle 118 has moved in a horizontal plane (e.g., in second direction 162 and/or third direction 164) as well as in the vertical direction (e.g., first direction 160) to add further droplets to first layer 400. Thus, a second layer 402 is beginning to be formed. Similarly, in FIG. 5, second layer 402 has been completed, forming a first composite layer 500 comprising first layer 400 and second layer 402, while a third layer 502 is being formed. In some embodiments, the process depicted in FIGS. 3-5 may be repeated multiple times to build a structure of desired thickness, shape, and/or area.

As described with reference to FIG. 2, in some embodiments, printing system 100 can maintain a print distance between nozzle 118 and print surface 148 to attach droplets 202 to print surface 148. The print distance and other aspects of printing relevant to the disclosed process may vary or be otherwise adjusted, as described in Waati et al., U.S. patent application Ser. No. 14/935,977, filed Nov. 9, 2015 and titled "Three-Dimensional Printing Along A Curved Surface," the disclosure of which is hereby incorporated by reference in its entirety. In other embodiments, the printing method utilized may feature one or more of the methods described in the Tack and Drag case. In some embodiments, structures can be formed using any of the methods described in Jones et al., U.S. Patent Publication Number 2014/0020192, published Jan. 23, 2014 and titled "Footwear Assembly Method With 3D Printing," the disclosure of which is hereby incorporated by reference in its entirety.

Figure 6:
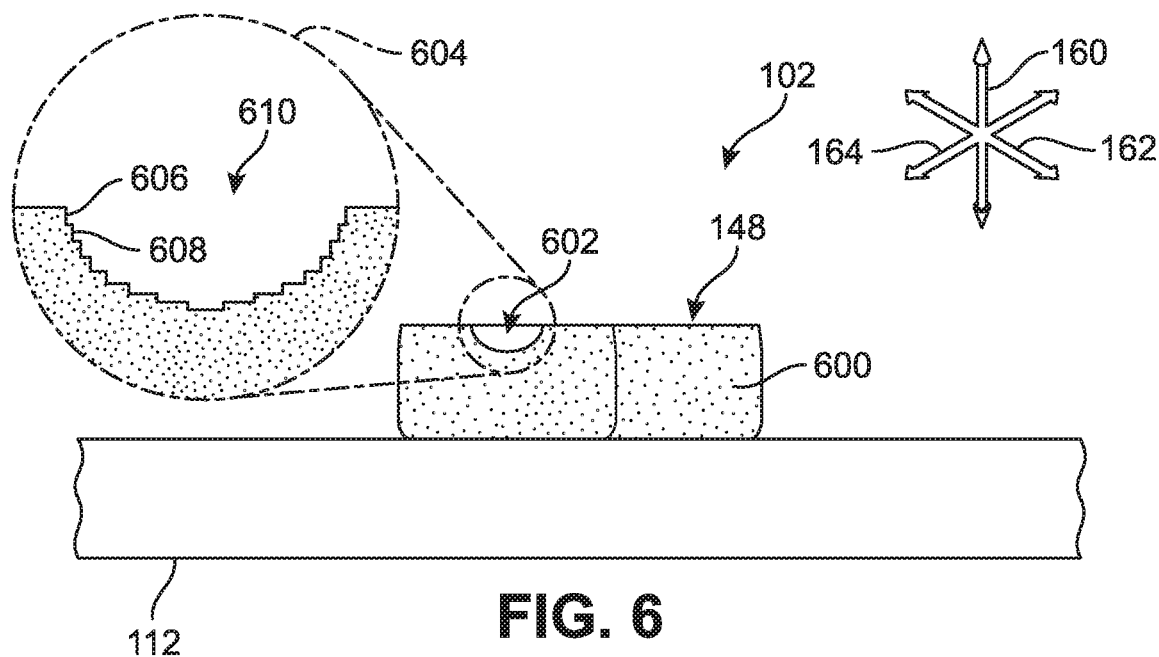
FIG. 6 is a schematic view of an embodiment of a printed structure.
Figure 7:
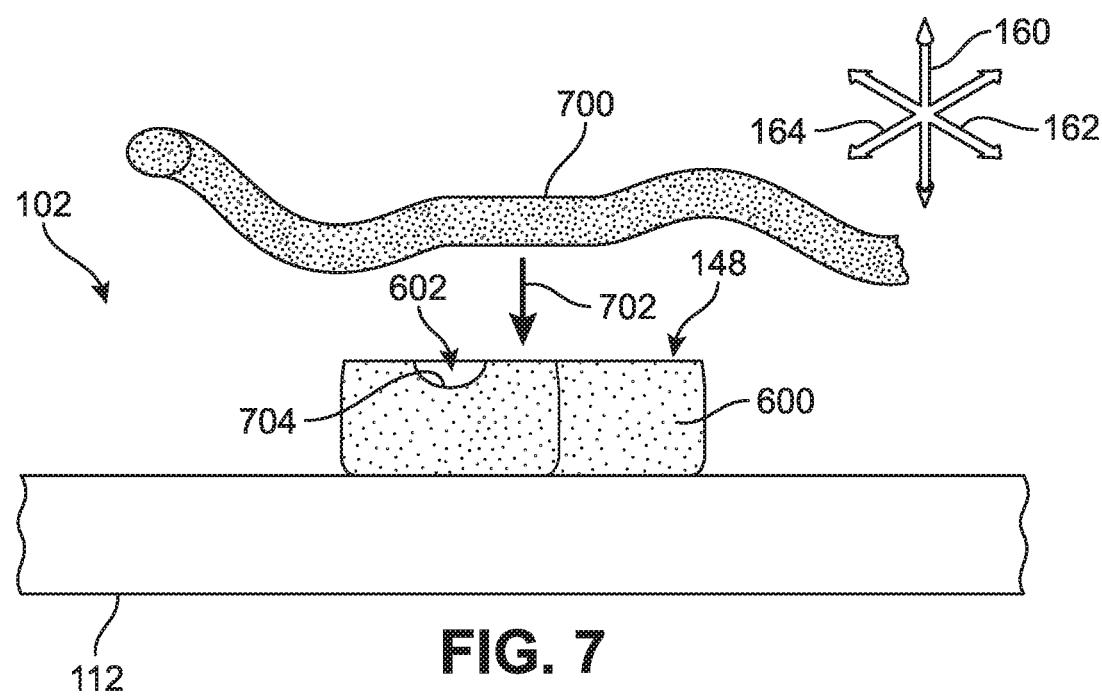
FIG. 7 is a schematic view of an embodiment of a printed structure and an element.

In FIG. 6, a first partial structure 600 comprising multiple layers of printed material is depicted. First partial structure 600 includes a first recess 602. In some embodiments, first recess 602 is formed by adding multiple layers in a step pattern that comprise the portion of first partial structure 600 which include first recess 602. For example, as seen in magnified area 604, the edges of first recess 602 are a plurality of steps 610 along the surface of first partial structure 600, including a first step 606 and a second step 608. In other words, in some embodiments, various portions of a printed structure may include differences in thickness, area, material, shape, design in order to form recesses, openings, or other features. It should be noted that in other embodiments, first recess 602 may be formed at an earlier point in printing, or at a later point.

In different embodiments, first recess 602 may vary in size or dimension. For example, first recess 602 may be larger or smaller than shown in FIG. 6. In other embodiments, first recess 602 may include portions that are more narrow or wider than depicted in FIG. 6. In some embodiments, there may be multiple recesses, or the structure may include no recess.

In different embodiments, a printed structure may incorporate various elements. For example, in FIG. 7, first partial structure 600 is shown adjacent a second lace 700. Second lace 700 may be inserted, placed, disposed, laid down along or otherwise provided to first partial structure 600 at different points of the printing process. In some embodiments, second lace 700 may be presented before first recess 602 is formed. In other embodiments, second lace 700 may be provided during or after the formation of first recess 602.

In some embodiments, printing may be paused or interrupted to allow the incorporation of elements such as second lace 700. However, in other embodiments, printing may be ongoing while second lace 700 is added to first partial structure 600. In one embodiment, second actuating system 190 may be used to place second lace 700 within recess 602 of first partial structure 600.

In some embodiments, the size, shape and dimension of first recess 602 may be formed to generally correspond at least in part to the size, shape, and dimensions of an element. For example, in FIG. 7, first recess 602 provides a recess that generally matches the contours of at least a portion of second lace 700. In other words, as second lace 700 is moved vertically down into recess 602 (i.e., in the direction of indicated by arrow 702), and is laid along a recess surface 704, at least a portion of second lace 700 fits snugly and securely within the curvature provided by first recess 602. In other embodiments, first recess 602 may be substantially larger than second lace 700 or otherwise provide a less secure fit to second lace 700. For example, in one embodiment, there may be no recess, or the curvature of the recess may be nearly flat such that second lace 700 rests on a surface that does not securely hold second lace 700.

Figure 8:
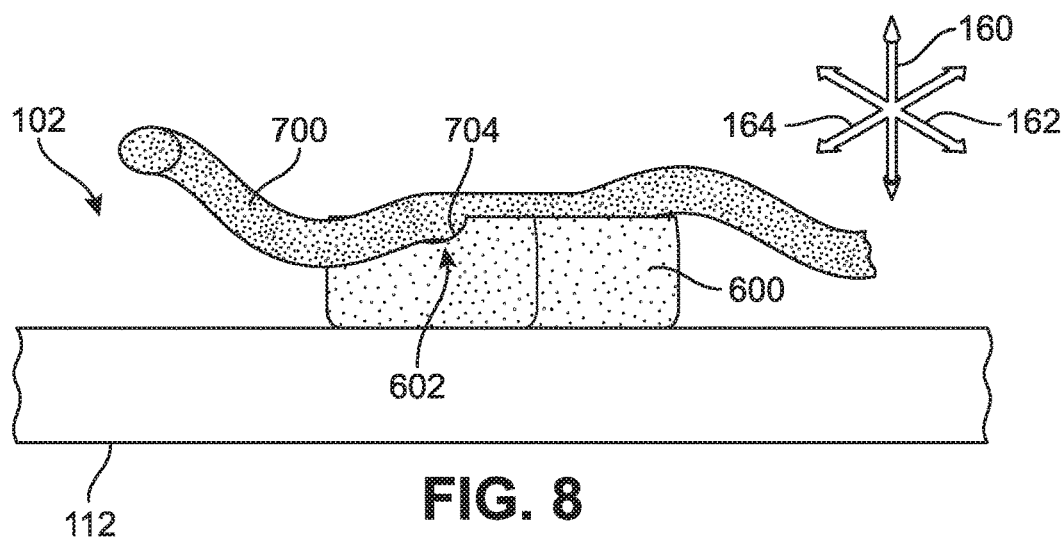
FIG. 8 is a schematic view of an embodiment of a printed structure with an element.
Figure 9:
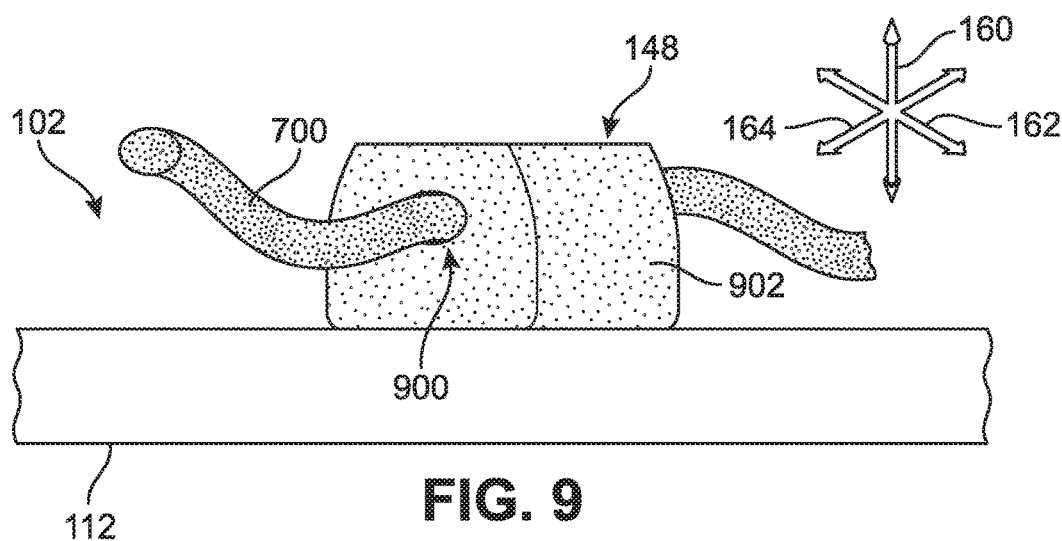
FIG. 9 is a schematic view of an embodiment of a printed structure with an element.
Figure 10:
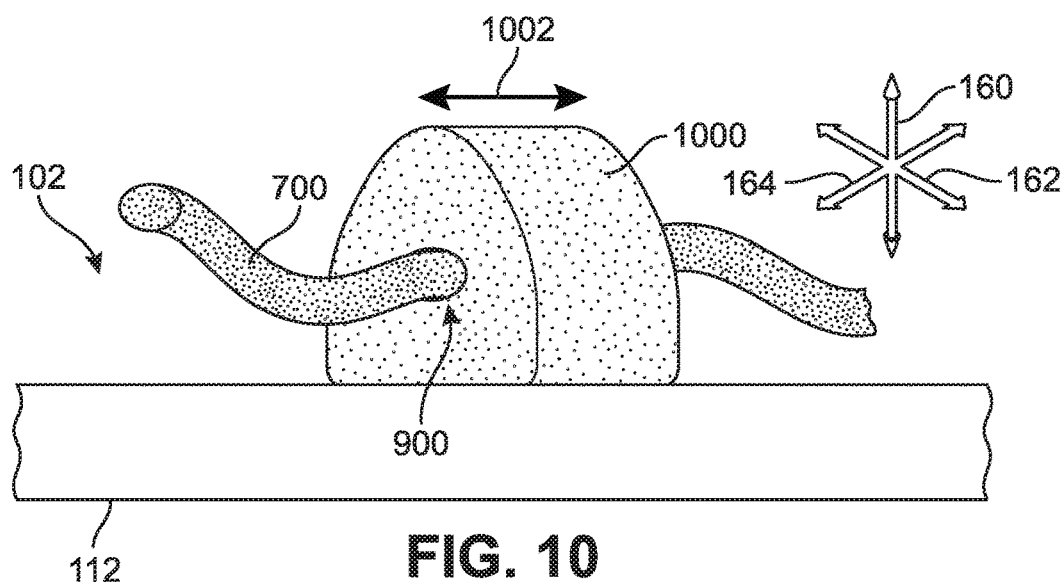
FIG. 10 is a schematic view of an embodiment of a printed structure with an element.

In FIG. 8, second lace 700 has been placed along recess surface 704 of first partial structure 600. As printing continues in FIG. 9, additional layers are laid over first partial structure 600, as well as second lace 700, forming a second partial structure 902. Second partial structure 902 includes a first tunnel 900, formed in part with previously formed first recess 602. Thus, a portion of second lace 700 is now covered by or enclosed within first tunnel 900 of second partial structure 902. In FIG. 10, printing is completed, and a third structure 1000 has been formed. Second lace 700 is positioned such that a portion of second lace 700 is disposed entirely within an interior portion of third structure 1000. In some embodiments, second lace 700 may be attached within first tunnel 900, whereby second lace 700 is substantially anchored and immobilized within third structure 1000. In other embodiments, second lace 700 may retain some mobility, and be able to move in a generally horizontal direction 1002 through first tunnel 900, at least to some extent.

It should be noted that in different embodiments, multiple printed structures may be formed that include or incorporate a single lace. For example, in one embodiment, third structure 1000 may be formed with second lace 700, and a fourth structure may also be formed that includes second lace 700. Additional structures may also be printed that include second lace 700. In other embodiments, multiple lace elements (or other types of elements) may be used to form neighboring printed structures.

In addition, while the embodiments herein depict first tunnel 900 as formed entirely of printed material, it should be noted that in other embodiments one or more portions of a tunnel may be comprised of the substrate upon which the structure is printed. In other words, in some embodiments, the bottom portion of a tunnel may be formed (or provided) by the underlying object, including a base material such as an upper or other material, to which the tunnel is attached. Furthermore, the embodiments described herein may apply any of the features or printing techniques described in Guest et al., U.S. Patent Application No. 62/263,923, filed Dec. 7, 2015 and titled "3D Printed Tunnel Spring Structure," Guest et al., U.S. Patent Application No. 62/263,898, filed Dec. 7, 2015 and titled "3D Printed Tunnels with Window for Cable Loop," and Guest et al., U.S. Patent Application No. 62/263,891, filed Dec. 7, 2015 and titled "3D Printed Segmented Tunnels With Cables," the disclosures of which are hereby incorporated by reference in their entirety.

In different embodiments, elements 194 may be utilized to form other types of tunnels within a printed structure. In some embodiments, tunnels may refer to any opening in the interior of the printed structures. As will be discussed further below, tunnels may include various sizes, shapes, dimensions, and/or thicknesses. Tunnels may also be asymmetrical or symmetrical, and include a through-hole or blind-hole. It should be noted that tunnels may comprise various shapes, and need not be round or cylindrical in shape, as will be discussed below with reference to FIGS. 31-34.

Figure 11:
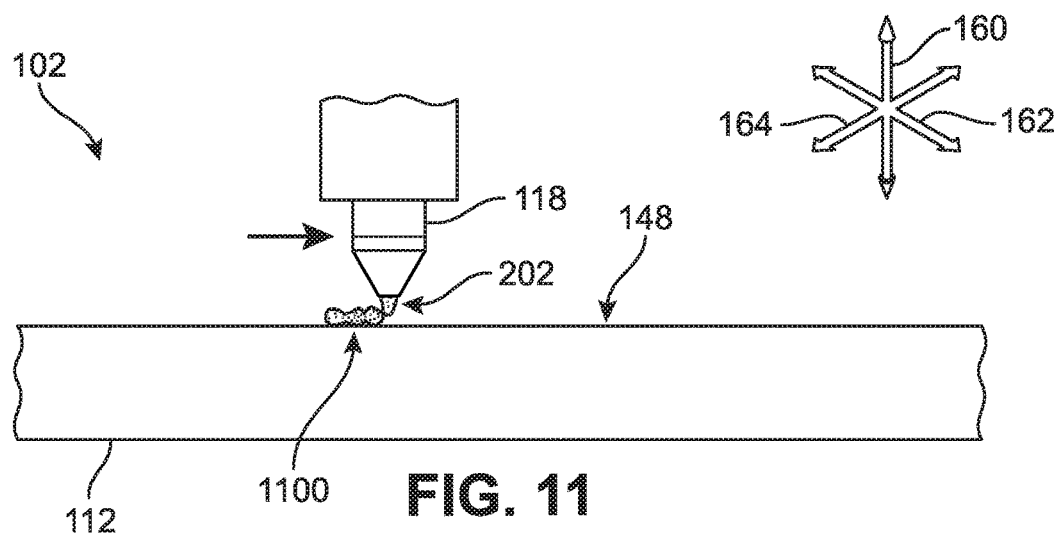
FIG. 11 is a schematic view of an embodiment of a portion of a printing device during operation.
Figure 12:
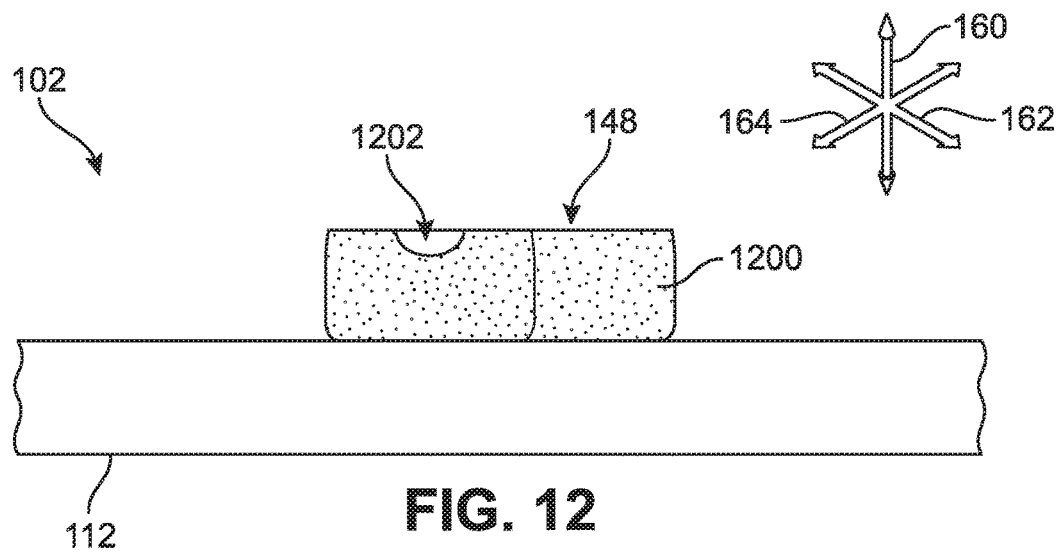
FIG. 12 is a schematic view of an embodiment of a printed structure.
Figure 13:
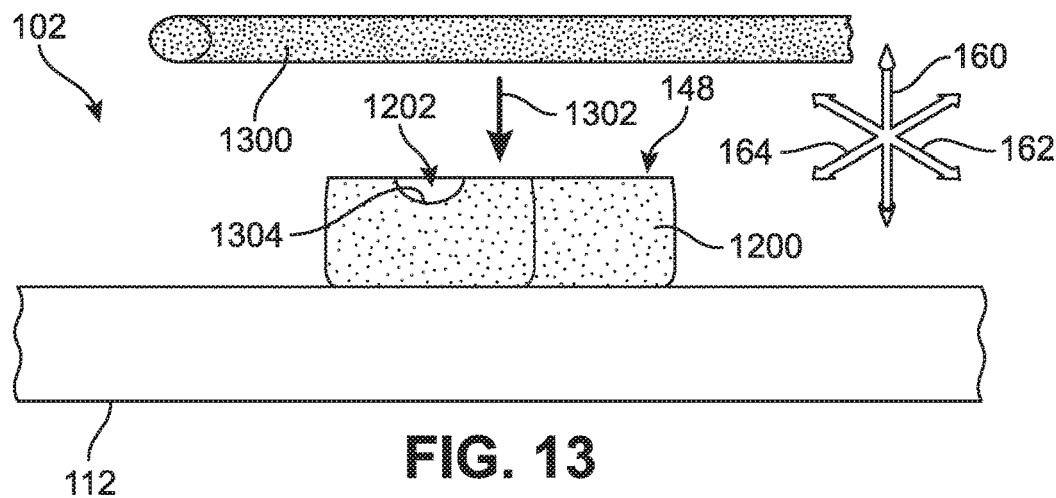
FIG. 13 is a schematic view of an embodiment of a printed structure and an element.

For example, in FIG. 11, a portion of a printing device 102 is depicted. Droplets 202 are being deposited by nozzle 118 onto print surface 148 of tray 112. In FIG. 11, printed material 1100 comprising multiple droplets 202 is beginning to coalesce. In some embodiments, as shown in FIG. 12, after repeating the process described above with respect to FIGS. 3-5, a third partial structure 1200 comprising multiple layers of printed material is formed. Third partial structure 1200 includes a second recess 1202. In some embodiments, second recess 1202 is formed by adding multiple layers in a step pattern that comprise the portion of third partial structure 1200 that is associated with second recess 1202, as described above with reference to FIG. 6.

In different embodiments, a printed structure may incorporate various elements 194. For example, in FIG. 13, third partial structure 1200 is shown below a first shaft 1300. First shaft 1300 may be inserted, placed, disposed, laid down along or otherwise provided to third partial structure 1200 at different points of the printing process. In some embodiments, first shaft 1300 may be presented before second recess 1202 is formed. In other embodiments, first shaft 1300 may be provided during or after the formation of second recess 1202.

In different embodiments, a shaft may comprise a variety of materials, including but not limited to: a low-friction polymer material, metals, alloys, plastic, porcelain, as well as possibly other kinds of materials known in the art.

In some embodiments, printing may be paused or interrupted to allow the incorporation of elements such as first shaft 1300. However, in other embodiments, printing may be ongoing while first shaft 1300 is added to third partial structure 1200. In one embodiment, second actuating system 190 may be used to provide first shaft 1300 to third partial structure 1200.

In some embodiments, the size and shape of second recess 1202 may be selected to generally correspond at least in part to the size, shape, and dimensions of an element. For example, in FIG. 13, second recess 1202 provides a recess surface 1304 that generally matches the contours of at least a portion of first shaft 1300. In other words, as first shaft 1300 is moved in the direction of an arrow 1302, and is laid along recess surface 1304, at least a portion of first shaft 1300 can fit snugly and securely within the curvature provided by second recess 1202. In other embodiments, second recess 1202 may be substantially larger than first shaft 1300 or otherwise provide a less secure fit to first shaft 1300. For example, in one embodiment, there may be no recess, or the curvature of second recess 1202 may be nearly flat such that first shaft 1300 rests on a surface that does not securely hold first shaft 1300.

Figure 14:
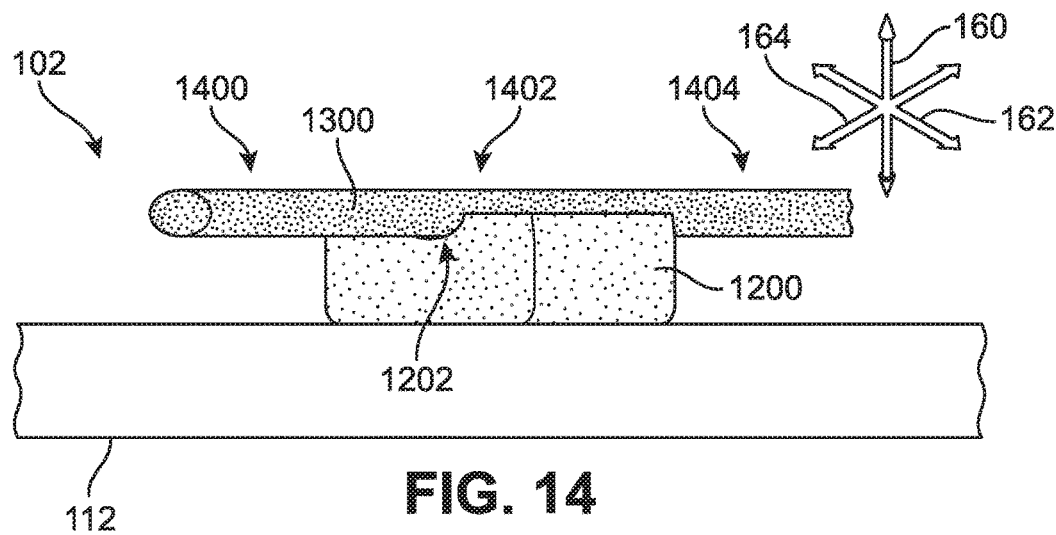
FIG. 14 is a schematic view of an embodiment of a printed structure with an element.

In FIG. 14, first shaft 1300 has been placed along recess surface 1304 (see FIG. 13) of third partial structure 1200. First shaft 1300 can be seen to include a first portion 1400, a second portion 1402, and a third portion 1404. In some embodiments, first portion 1400 and third portion 1404 are associated with the areas of first shaft 1300 that remain exposed, while second portion 1402 corresponds to the area of first shaft 1300 that is in contact with the printed structure.

Figure 15:
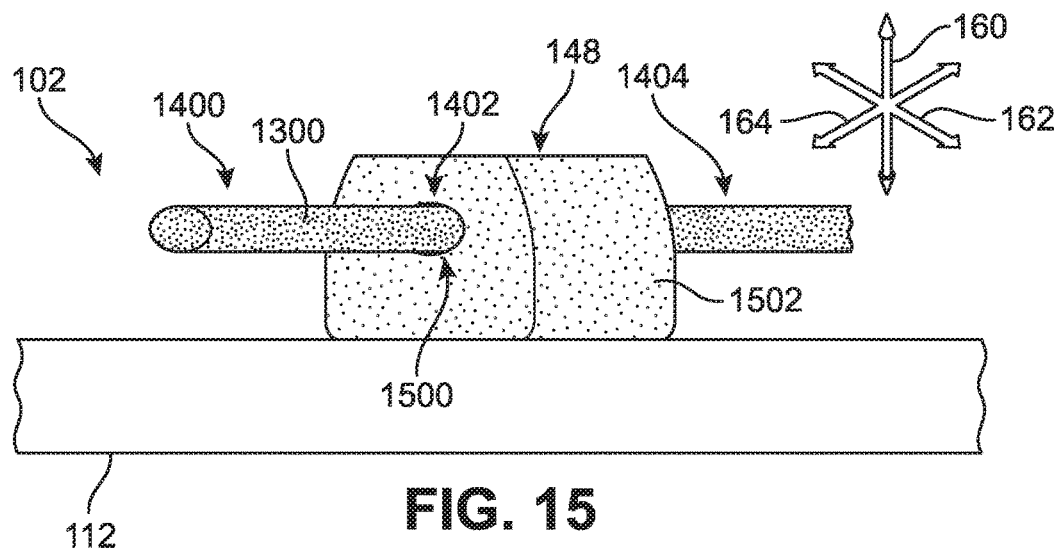
FIG. 15 is a schematic view of an embodiment of a printed structure with an element.
Figure 16:
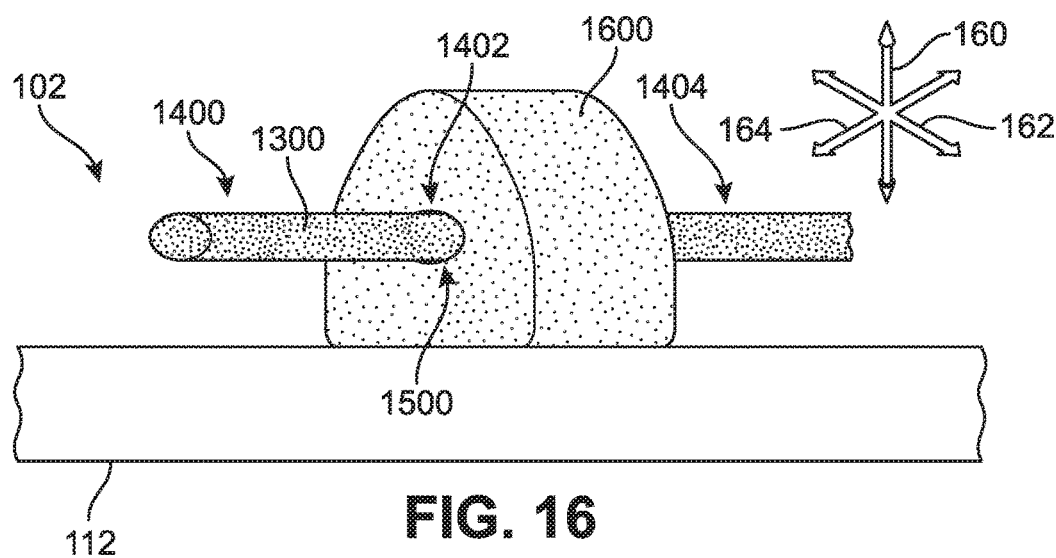
FIG. 16 is a schematic view of an embodiment of a printed structure with an element.

As printing continues in FIG. 15, additional layers are laid over third partial structure 1200, as well as over first shaft 1300, forming a fourth partial structure 1502. Fourth partial structure 1502 includes a second tunnel 1500, formed in part with the previously formed second recess 1202. Thus, second portion 1402 of first shaft 1300 is now covered by or enclosed within second tunnel 1500 of fourth partial structure 1502. In FIG. 16, printing is completed, and a fourth structure 1600 has been formed. First shaft 1300 is positioned such that second portion 1402 of first shaft 1300 is disposed entirely within an interior portion of fourth structure 1600, while first portion 1400 and third portion 1404 are positioned outside of fourth structure 1600.

In some embodiments, first shaft 1300 may be removed or detached from fourth structure 1600. In one embodiment, second actuating system 190 may be used to remove first shaft 1300 from fourth structure 1600. For example, in FIG. 17, first shaft 1300 is pulled from second tunnel 1500 in direction of an arrow 1700. In some embodiments, first shaft 1300 may be only partially removed from fourth structure 1600, or first shaft 1300 may be repositioned within fourth structure 1600. In some embodiments, as first shaft 1300 moves through second tunnel 1500, first portion 1400 is enclosed within fourth structure 1600, while second portion 1402 moves out of second tunnel 1500 and becomes exposed along with third portion 1404. In other embodiments, first shaft 1300 may be removed from another direction, such that third portion 1404 becomes enclosed within fourth structure 1600, while second portion 1402 moves out of second tunnel 1500 and becomes exposed along with first portion 1400. In an alternative embodiment, first shaft 1300 may remain within second tunnel 1500. It should be noted that upon removal of first shaft 1300, first shaft 1300 may be reused.

Figure 18:
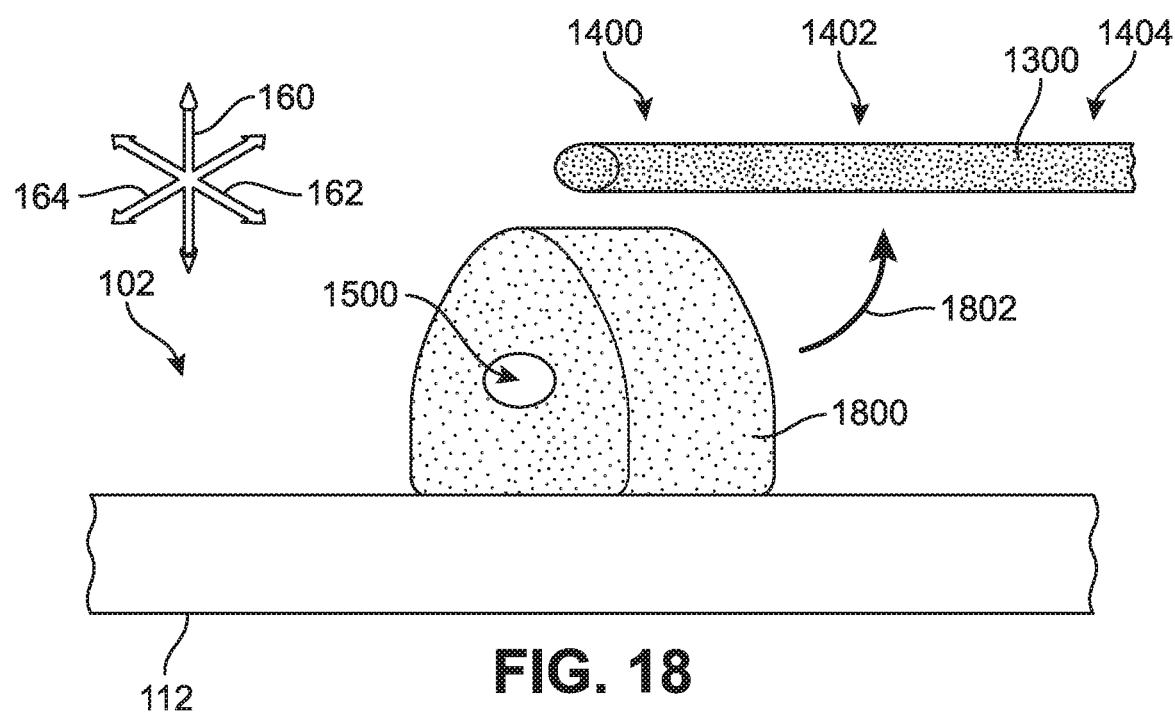
FIG. 18 is a schematic view of an embodiment of a printed structure and an element.

In one embodiment, as shown in FIG. 18, upon removal of first shaft 1300 as depicted by an arrow 1802, a fifth structure 1800 with a hollow or emptied second tunnel 1500 is formed. Various aspects of fifth structure 1800 are depicted in FIGS. 19-22. For example, in FIG. 19, an isometric view of fifth structure 1800 is presented. Second tunnel 1500 of fifth structure 1800 can be seen to include a first end 1900 and a second end 1902 (represented by dotted lines). The opening of first end 1900 is in fluid communication with the opening of second end 1902. In FIG. 20, a side-view of fifth structure 1800 is shown. The side-view depicts the path of second tunnel 1500 through fifth structure 1800, from first end 1900 to second end 1902, represented by a dotted line. FIG. 21 is a front view and FIG. 22 is a rear view of fifth structure 1800. In FIG. 21, the opening associated with first end 1900 of second tunnel 1500 can be seen, and similarly, in FIG. 22, the opening associated with second end 1902 of second tunnel 1500 can be seen. Thus, second tunnel 1500 provides a through-hole aperture or opening through the length of fifth structure 1800. In some embodiments, this aperture may have any additional object or material inserted or incorporated within the aperture (including but not limited to first shaft 1300 or another element), or it may remain unfilled.

Thus, in different embodiments, printing system 100 may allow formation of printed structures that include throughholes or other types of openings. In one embodiment, upon removal of elements, the tunnels may be hollow or provide a space within the printed structure. It should be noted that in other embodiments, printing system 100 may also be utilized to form blind-hole openings within a printed structure. For example, as seen in FIGS. 23-26, various aspects of a sixth structure 2300 are depicted. In FIG. 23, an isometric view of sixth structure 2300 is presented. A third tunnel 2302 of sixth structure 2300 can be seen to include a first end 2304 and a second end 2306 (represented by dotted lines). However, second end 2306 of third tunnel 2302 is disposed within the interior of sixth structure 2300. In other words, the opening of first end 2304 does not share a fluid opening beyond second end 2306 to a rear side 2308 of sixth structure 2300. Thus, sixth structure 2300 includes a blindhole aperture, so that there is an opening disposed along only a front side 2310 of sixth structure 2300. In FIG. 24, a side-view of sixth structure 2300 is shown. The side view depicts the path of third tunnel 2302 through sixth structure 2300, from first end 2304 to second end 2306, represented by a dotted line. FIG. 25 is a front view and FIG. 26 is a rear view of sixth structure 2300. In FIG. 25, the opening associated with first end 2304 of third tunnel 2302 can be seen along front side 2310. However, in FIG. 26, there is a substantially solid printed area comprising rear side 2308, without an opening as described in FIG. 22. In other words, third tunnel 2302 provides a blind-hole aperture or opening through a portion of the length of sixth structure 2300. In some embodiments, the aperture may have any object or material inserted or incorporated within, or it may remain unfilled.

Figure 27:
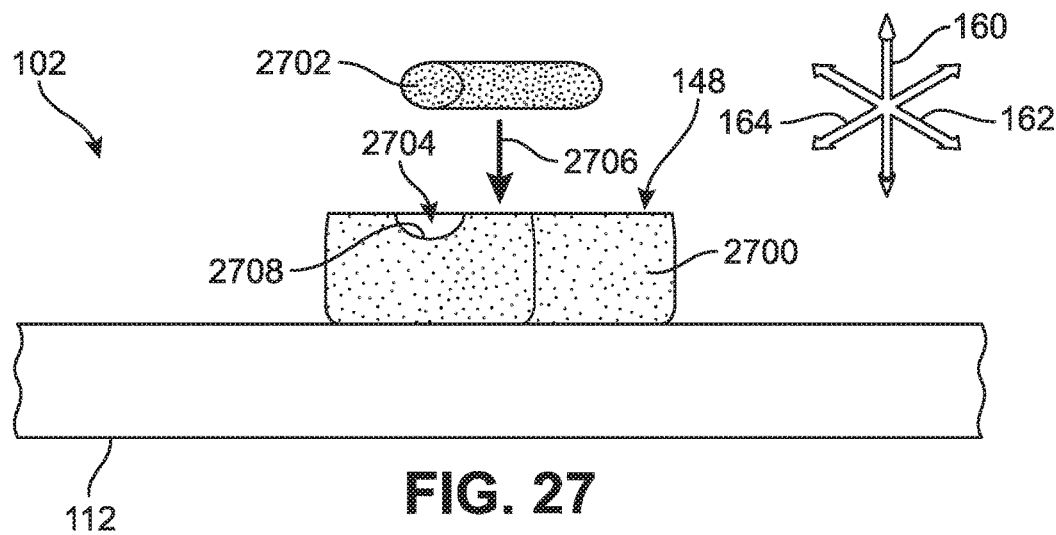
FIG. 27 is a schematic view of an embodiment of a printed structure and an element.

In different embodiments, it may be useful to form composite printed structures that retain an incorporated element within the structure. For example, printed structures that retain an element may be more resilient, sturdy, and resist deformation. Furthermore, composite printed structures can provide additional components pre-assembled for use in other articles. In FIG. 27, a fifth partial structure 2700 is depicted as formed on tray 112 in a partial representation of printing device 102. Fifth partial structure 2700 includes a third recess 2704. Depicted above fifth partial structure 2700 is a second shaft 2702. As described above, in some embodiments, the size, shape and dimensions of third recess 2704 may be selected to generally correspond at least in part to the size, shape, and dimensions of an element. For example, in FIG. 27, third recess 2704 provides a recess surface 2708 that generally matches the contours of at least a portion of second shaft 2702. In other words, as second shaft 2702 is moved in the direction of an arrow 2706, and is laid along recess surface 2708, at least a portion of second shaft 2702 can fit snugly and securely within the curvature provided by third recess 2704. In other embodiments, third recess 2704 may be substantially larger than second shaft 2702 or otherwise provide a less secure fit to second shaft 2702. For example, in one embodiment, there may be no recess, or curvature of third recess 2704 may be nearly flat such that second shaft 2702 rests on a surface that does not include contours for securely holding second shaft 2702.

Figure 28:
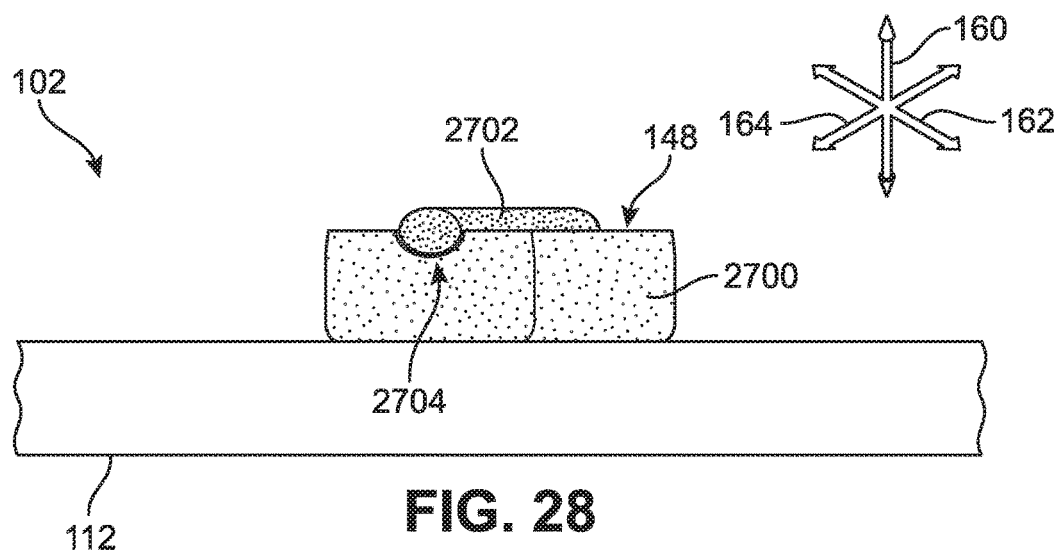
FIG. 28 is a schematic view of an embodiment of a printed structure with an element.
Figure 29:
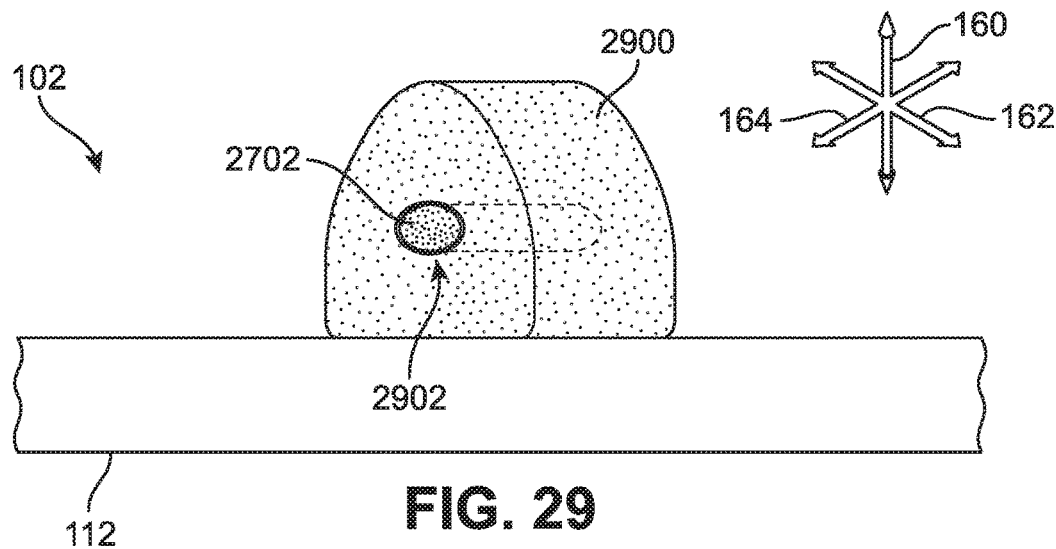
FIG. 29 is a schematic view of an embodiment of a printed structure with an element.
Figure 30:
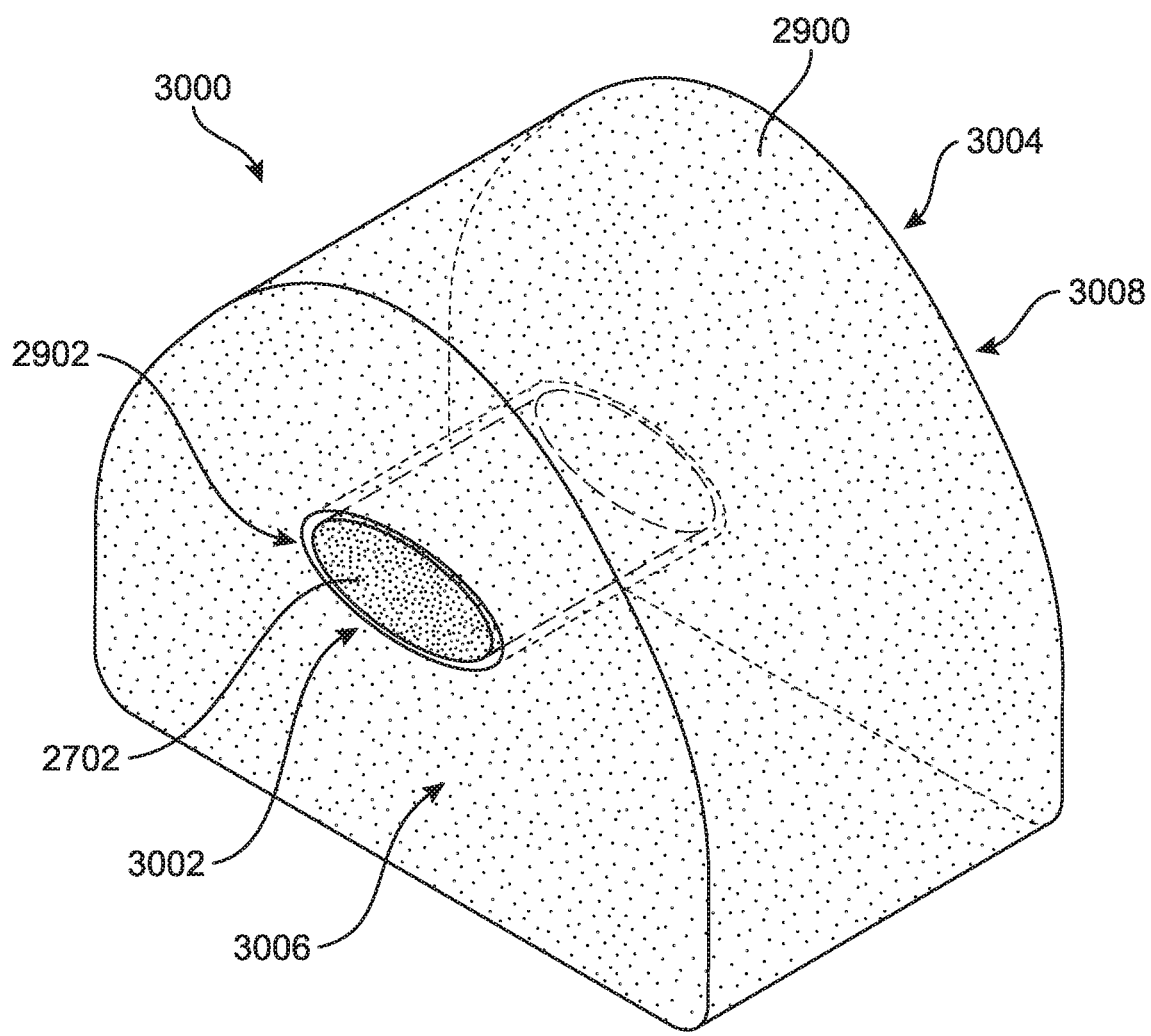
FIG. 30 is an isometric view of an embodiment of a printed structure with an element.

In FIG. 28, second shaft 2702 has been placed along recess surface 2708 (see FIG. 27) of fifth partial structure 2700. As printing continues in FIG. 29, additional layers have been printed over fifth partial structure 2700, as well as over second shaft 2702, forming a seventh structure 2900. Seventh structure 2900 includes a fourth tunnel 2902, formed in part with the previously formed third recess 2704. In the embodiment of FIG. 29, substantially the entire length and width of second shaft 2702 is now covered by or enclosed within fourth tunnel 2902 of seventh structure 2900. Thus, in some embodiments, as shown in FIG. 30, a composite printed structure 3000 can be formed, where an element (such as second shaft 2702) is joined, attached, enclosed, or otherwise disposed within the printed structure. Together, a printed structure may be formed in some embodiments that is more resilient, rigid, and/or or includes the properties of both the printed material and the included element.

In the embodiment of FIG. 30, composite printed structure 3000 includes fourth tunnel 2902 with a first end 3002 and a second end 3004. Second end 3004 is disposed within the interior of composite printed structure 3000. In other words, fourth tunnel 2902 forms a blind-hole aperture in composite printed structure 3000. However, it should be noted that in other embodiments, an element such as second shaft 2702 may be placed or incorporated into composite printed structure 3000 such that both first end 3002 and second end 3004 are disposed in the interior of fourth tunnel 2902, and no opening is present on either a front side 3006 or a rear side 3008. Thus, as described above, a fully enclosed element located entirely within composite printed structure 3000 is possible in some embodiments.

It should be noted that in other embodiments, a composite printed structure may also include portions that permit some portions of the element to be exposed while the element is retained by the structure. For example, a composite printed structure may have various openings along the surface of the composite printed structure that expose or make visible the incorporated element. In one embodiment, a composite printed structure may have windows or gaps that expose one or more portions of the incorporated element.

Figure 17:
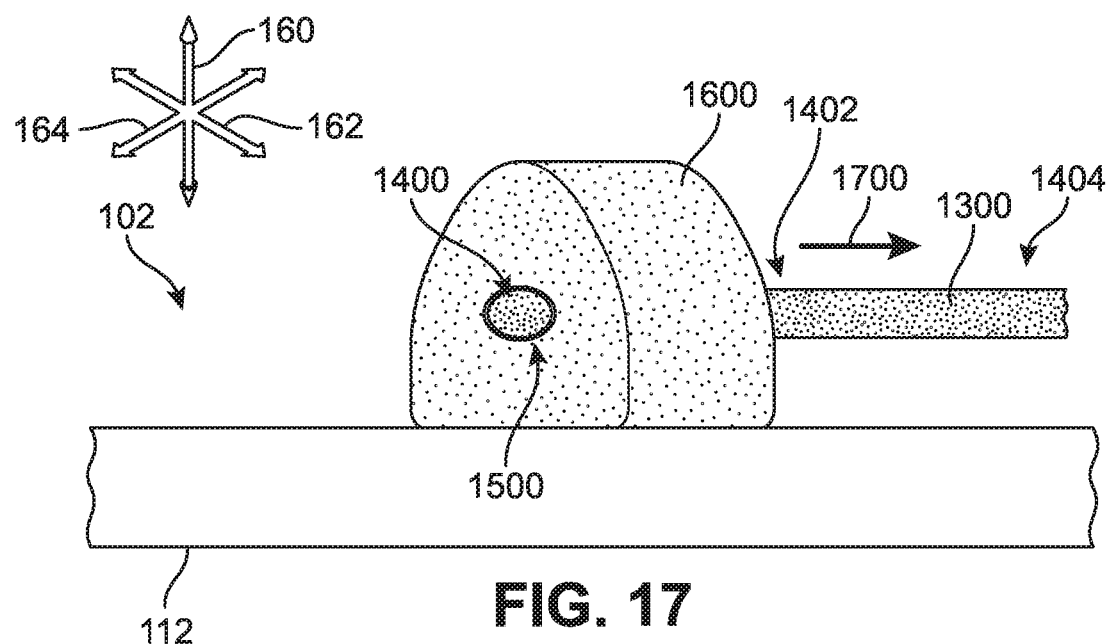
FIG. 17 is a schematic view of an embodiment of a printed structure with an element.

It should be understood that the embodiments described above with respect to the composite printed structures may also include or incorporate elements that are not fixed in place. In other words, printing system 100 may form composite printed structures with operative elements. Operative elements can include portions that are moveable relative to another portion of the operative element. As shown through FIGS. 6-18, an element may be disposed within a printed structure (e.g., second lace 700 in first tunnel 900 of third structure 1000, or first shaft 1300 in second tunnel 1500 of fourth structure 1600). While in some embodiments, an element may be removed (as shown in FIGS. 16-18), in other embodiments, the same element may be retained by the printed structure. In addition, in one embodiment, the element that is retained may be configured to move or slide through a tunnel formed in the printed structure.

In some embodiments, for example, composite printed structures may be designed to provide guide tubes or routing components for a lacing system in an article of footwear. Thus, in some cases, a user may be able easily to tighten or loosen the laces (i.e., the elements) disposed within the printed guide tubes.

A variety of elements may be disposed within a printed structure while retaining the ability to slide or translate through the printed structure. In some embodiments, each of the elements described or mentioned herein may be configured such that they are disposed in a printed structure, but are not attached to any portion of the printed structure. In other words, an element may be disposed within a printed structure and also be able to readily move through and/or along the printed structure.

Thus, in some embodiments, second lace 700 in third structure 1000 may be moved in a generally horizontal direction 1002. In one embodiment second lace 700 may be able to slide or be moved translationally (back and forth) through first tunnel 900. This may provide the printed structure with the ability to act as a support, guide, router, covering, protection, sleeve, tube, anchor, or other such component for a portion of the element, while the element itself remains capable of movement through the printed structure. A further example may be seen in FIGS. 16-17, where first shaft 1300 is shown as it slides or moves through second tunnel 1500 of fourth structure 1600. In FIG. 18, first shaft 1300 is removed from fourth structure 1600. However, in other cases, it should be understood that first shaft 1300 may remain within fourth structure 1300. In one case, first shaft 1300 can be configured to slide through second tunnel 1500 if so desired. It should also be understood that in some cases, an element may be removed from a printed structure, and a different element may be inserted within the same printed structure. Thus, although first shaft 1300 is removed from fourth structure 1300 in FIG. 18, a lace or another shaft, or a different element altogether, may be placed, incorporated into or used with second tunnel 1500.

Printing system 100 may provide for the translation of elements in the printed structures in a variety of ways. In some embodiments, the materials comprising the printed structures may be different from the material comprising the elements. In some cases, the materials of either or both of the printed material and elements may be resistant to adhesion. In different cases, the use of dissimilar or incompatible materials that do not readily bind or adhere to one another, or, in one case, materials that repel binding, may be used in each of the printed structure and/or the element. Thus, in some embodiments, the element may comprise a material that resists adhesion to the printed material. In one embodiment, the element could comprise one or more materials that include lower friction coefficients, such as materials with friction coefficients in the range of 0.01 and 0.30. In other embodiments, the printed material may comprise a material that resists adhesion to the element. In one embodiment, the printed material could comprise a material with a lower friction coefficients, such as material with a friction coefficient in the range of 0.01 and 0.30

Furthermore, in other cases, various portions of the elements or the interior of the tunnels (the printed material) may be coated with or otherwise include a non-stick material or a low friction material. Some examples of low friction materials include but are not limited to polymer coatings, fluorocarbons, polytetrafluoroethylene (PTFE) (e.g., Teflon), fluorinated ethylene propylene (FEP), perfluoroalkoxy (PFA), Delrin, paints and elastomeric coatings, anodized aluminium, phenolics, acetals, polyimides, polysulfone, polyphenylene sulfide, plastics, metallic materials, ceramics, silicone, enameled cast iron, seasoned cast iron, nylon, and/or other materials. In some instances, the coatings or material included in the elements or printed material can comprise thermoplastics or thermoplastic polymers. In other cases, the materials used may comprise thermosets.

As discussed above, elements may vary in shape, size, and other features in different embodiments. FIGS. 31-34 present a few examples of elements that may be placed on, utilized, incorporated or otherwise joined to a printed structure. In FIG. 31, a cylindrical shaped third shaft 3100 is illustrated. Third shaft 3100 has a first end 3102 that is generally circular, and a second end 3104 that is also circular. In the embodiment of FIG. 31, third shaft 3100 is generally uniform along its length, and first end 3102 and second end 3104 are substantially similar. In FIG. 32, a rectangular cylinder type fourth shaft 3200 is depicted. Fourth shaft 3200 includes sharper edges at a first end 3202 and second end 3204 relative to third shaft 3100. Similar to third shaft 3100, fourth shaft 3200 is generally uniform along its length, and first end 3202 and second end 3204 are substantially similar.

As seen in the Figures, different elements may be used to form varying shapes in the printed structures. Thus, in some embodiments, elements may be used which include additional edges, shapes, portions, or other features. For example, in FIGS. 33 and 34, two elements are depicted which may be contrasted with those previously presented in FIGS. 31 and 32. FIG. 33 illustrates a fifth shaft 3300 and FIG. 34 a sixth shaft 3400 that are substantially rectangular. However, fifth shaft 3300 includes a first vane 3306 and a second vane 3308 disposed along a first end 3302. Similarly, sixth shaft 3400 includes a first vane 3406 and a second vane 3408 disposed along first end 3402. For purposes of this description, a vane is a bump, irregularity, or additional component or piece that is part of an element or disposed along the length of the element. Furthermore, in the embodiments of FIGS. 33 and 34, the vanes are tapered, whereby the width of each vane decreases as it approaches first end 3302 of fifth shaft 3300 and first end 3402 of sixth shaft 3400 respectively. The tapering can provide a shaft with a smoother removal from a printed structure.

Vanes and other additional features of elements may provide printed structures with different designs, and allow insertion of variously shaped components. In some embodiments, vanes can enhance the aesthetic of a printed structure. In another embodiment, vanes may help form sections in the tunnels that are necessary for the utilization of the printed structure.

A second end 3304 of fifth shaft 3300 does not include a vane, nor does a second end 3404 of sixth shaft include a vane. In other embodiments, fifth shaft 3300 and/or sixth shaft 3400 may include different types or numbers of vanes, as well as vanes of different sizes and shapes. For example, fifth shaft 3300 in FIG. 33 has a first vane 3306 with a sharp edge, whereas sixth shaft in FIG. 34 has a first vane 3406 with a rounded edge relative to fifth shaft 3300. Thus, different types of shafts may be designed to provide a variety of different openings and tunnels or composites to a printed structure. It should be noted that in some embodiments, third shaft 3100, fourth shaft 3200, fifth shaft 3300 and/or sixth shaft 3400 may be reusable. Thus, the shape of an element, including any vanes, should allow it to be removed readily from the printed structure in which it was incorporated.

The printed structures of the present embodiments may provide enhanced support. In some cases, one or more printed structures may be attached to an underlying component such as a fabric layer of an upper or other article, and may act to enhance support over a portion of the component. This may occur in situations where the printed structure is more rigid than an underlying material (e.g., fabric, leather, etc.).

Figure 35:
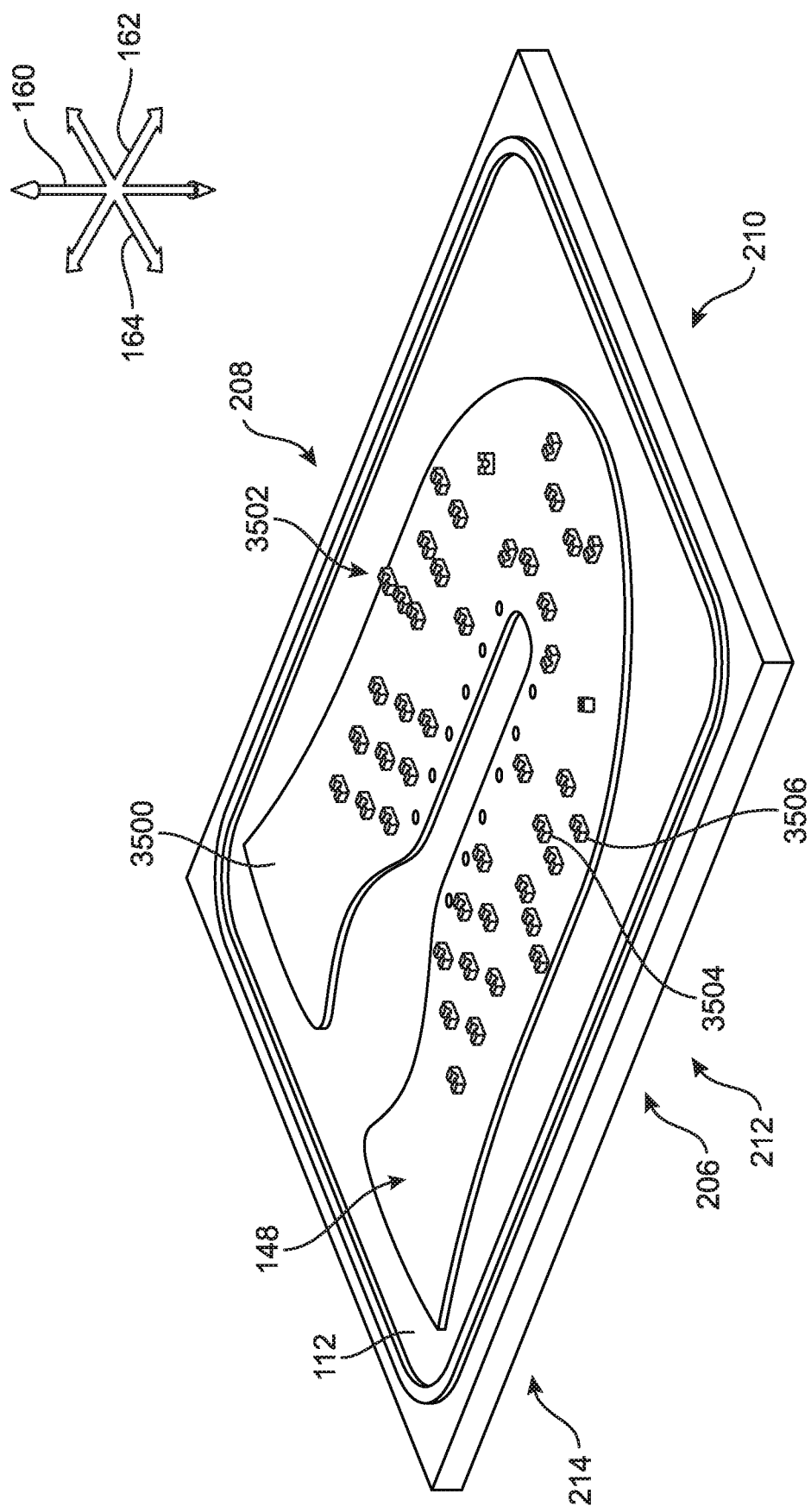
FIG. 35 is a schematic view of an embodiment of an upper in a printing device with a plurality of printed structures.
Figure 36:
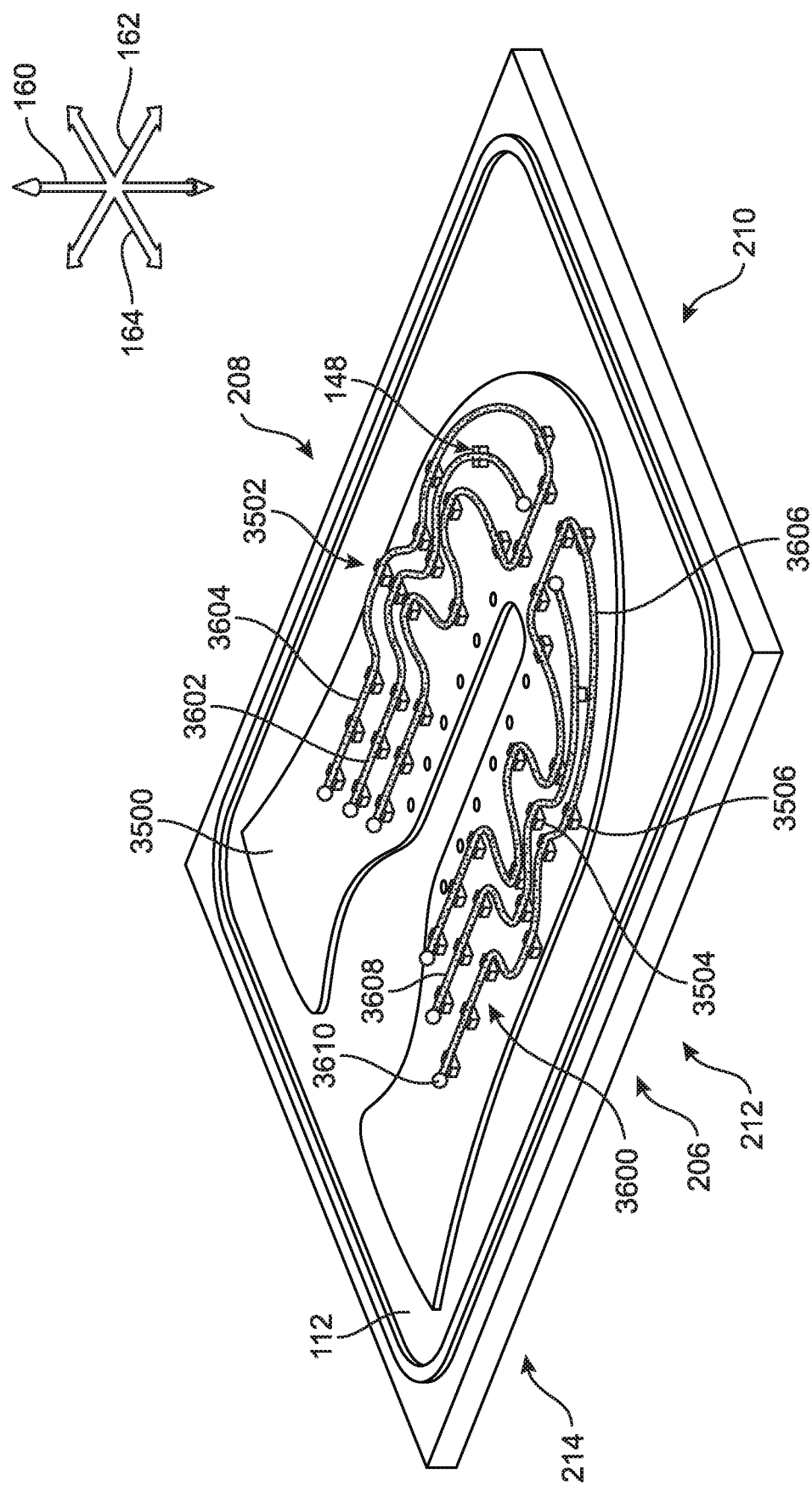
FIG. 36 is a schematic view of an embodiment of an upper in a printing device with a plurality of printed structures.

In some embodiments, as mentioned with respect to FIG. 2, printed structures may be included on an upper. FIGS. 35-38 depict an embodiment of an upper 3500 that includes an example of the printed structures described herein. Printed structures may be formed to provide eyelets or other lacing components in some embodiments. In FIG. 35, upper 3500 includes a plurality of partial structures 3502 that have been formed on print surface 148, which is a surface of upper 3500. Partial structures 3502 include a first partial structure 3504 and a second partial structure 3506 disposed along lateral side 206. Other partial structures 3502 are disposed along medial side 208. In FIG. 36, a plurality of lace elements 3600 have been introduced to upper 3500. Lace elements 3600 include a third lace 3602, a fourth lace 3604, a fifth lace 3606, and a sixth lace 3608. In FIG. 36, third lace 3602 and fourth lace 3604 are disposed along medial side 208, and fifth lace 3606 and sixth lace 3608 are disposed along lateral side 206. Lace elements 3600 have been disposed along upper 3500 such that each partial structure printed on upper 3500 is in contact with a lace element. For example, first partial structure 3504 is in contact with sixth lace 3608, and second partial structure 3506 is in contact with fifth lace 3606. In some embodiments, a lace end 3610 or another lace component may also be included with lace elements 3600. In other embodiments, there may be no additional components attached to lace elements 3600.

Figure 37:
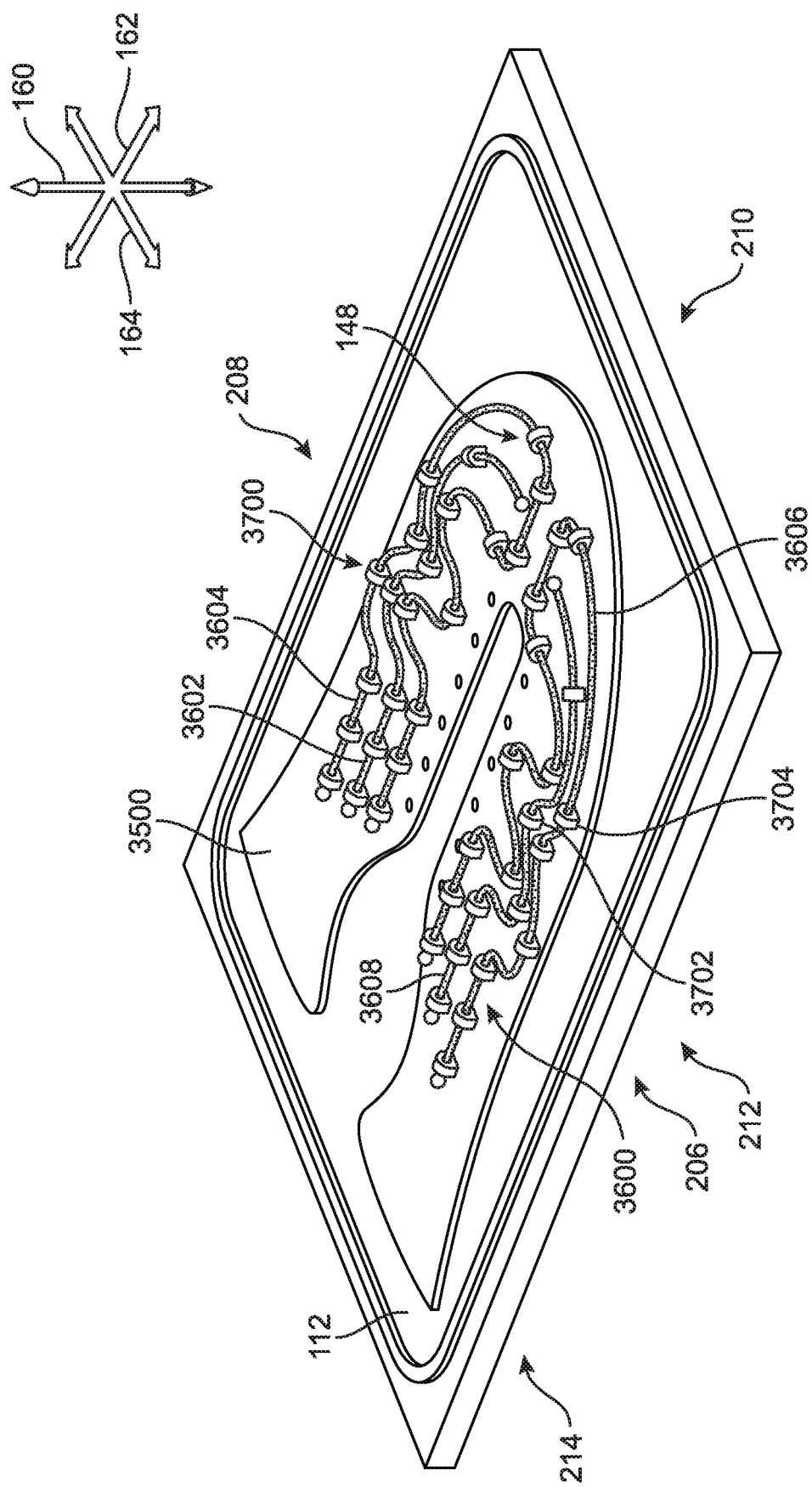
FIG. 37 is a schematic view of an embodiment of an upper in a printing device with a plurality of printed structures.

In FIG. 37, additional printed material has been added to each of partial structures 3502 of FIGS. 35 and 36. Upper 3500 includes a plurality of structures 3700. Plurality of structures 3700 have incorporated plurality of lace elements 3600 within each structure. For example a seventh structure 3702 has incorporated a portion of sixth lace 3608 and an eighth structure 3704 has incorporated a portion of fifth lace 3606. In some embodiments, structures 3700 may comprise a series of eyelets for lace elements 3600. In other embodiments, structures 3700 may comprise any other component or part of upper 3500.

Figure 38:
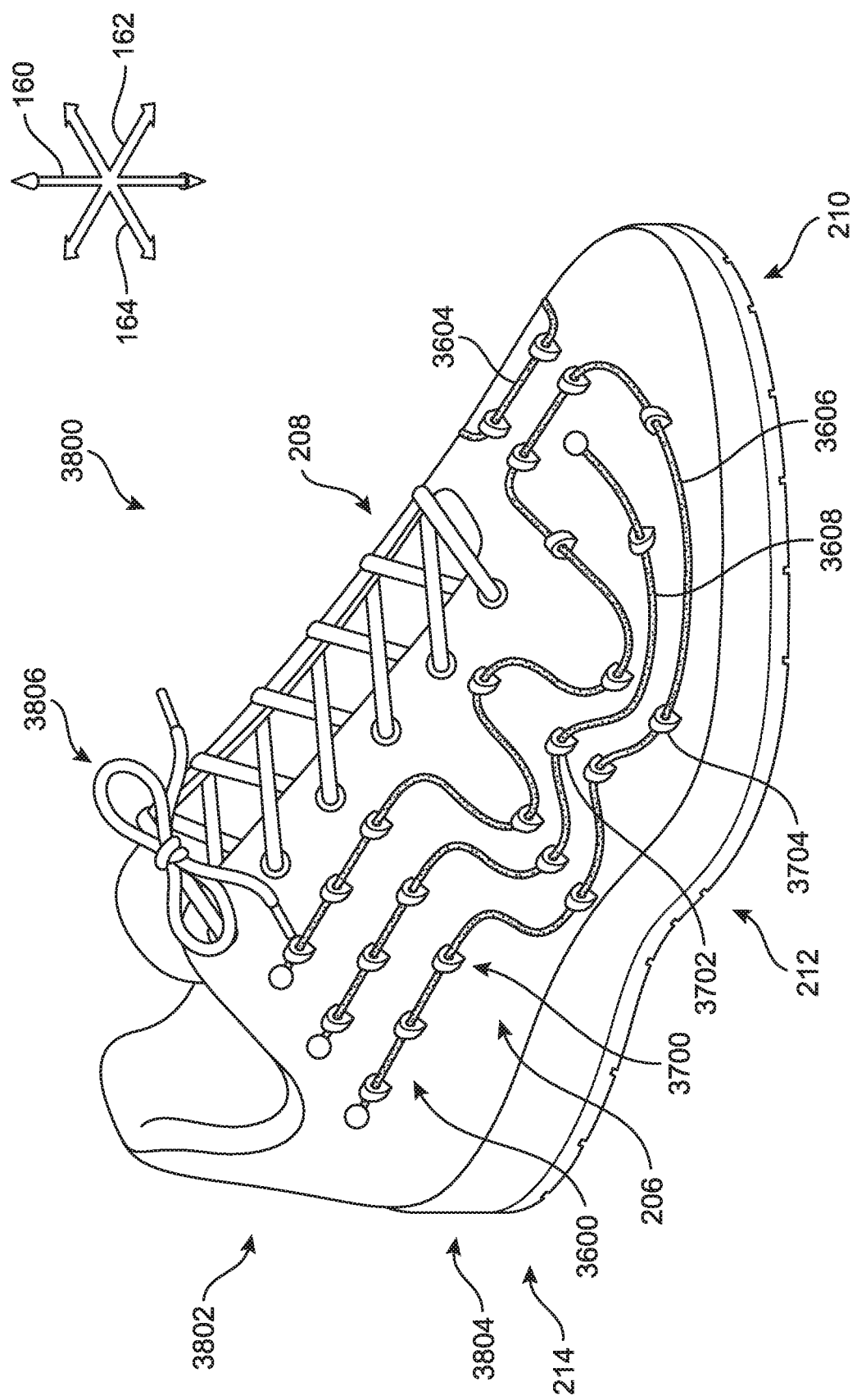
FIG. 38 is an isometric view of an embodiment of an article of footwear with a plurality of printed structures.

FIG. 38 provides an illustration of an embodiment of flattened upper 3500 of FIGS. 35-37 that has been assembled as a three-dimensional upper 3802. Upper 3802, along with a sole structure 3804 and laces 3806, comprise a third article 3800. Third article 3800 is an article of footwear 3800 that includes printed structures 3700 with lace elements 3600. In different embodiments, a variety of designs, patterns, components, elements, structures, and other features may be included in an article using the techniques described herein.

In the exemplary embodiment, printed structures 3700 with lace elements 3600 can provide an aesthetic design for upper 3802 and/or and means for controlling tension across portions of upper 3802. Thus in some cases, printed structures 3700 may be arranged to control the positioning of lace elements 3600 so as to provide specific tensioning configurations. Moreover, in some cases, provisions may be included for adjusting the tension provided by lace elements, for example by including mechanisms for maintaining tension in one or more of the lace elements 3600.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A method of printing one or more structures, the method comprising:
   discharging a printed material from a nozzle onto a print surface;
   forming at least a first layer of a first structure using the printed material;
   placing at least a portion of an element adjacent the first layer of the first structure, wherein the at least a portion of the element is in contact with the first layer;
   forming at least a second layer of the first structure using the printed material;
   enclosing the at least a portion of the element at least partially within the first structure;
   printing a second structure adjacent the first structure; and
   enclosing at least another portion of the element at least partially within the second structure.

2. The method according to claim 1, wherein the printed material is extruded in the form of droplets.

3. The method according to claim 1, wherein the element comprises a material that resists adhesion to the printed material, and wherein the element is configured to move within the second structure.

4. The method according to claim 3, wherein the element is a cord.

5. The method according to claim 4, wherein the cord is a lace for an article of footwear.

6. The method according to claim 1, wherein the element is a reusable shaft.

7. The method according to claim 6, further comprising removing the reusable shaft from the first structure.

8. The method according to claim 7, wherein removing the element further includes forming a through-hole in the first structure.

9. The method according to claim 8, further comprising inserting a lace into the through-hole of the first structure.

10. The method according to claim 6, further comprising printing a second structure with the reusable shaft disposed at least partially within the second structure.

11. The method according to claim 10, further comprising removing the reusable shaft from the second structure.

12. The method according to claim 11, further comprising inserting a lace into a through-hole of the second structure.

13. A method of printing one or more structures on an article of apparel, the method comprising:
    discharging a printed material from a nozzle onto a print surface, wherein the print surface is a surface of the article of apparel;
    forming at least a first layer of a first structure using the printed material, wherein the first layer includes a recess;
    placing at least a portion of an element at least partially within the recess;
    forming at least a second layer of the first structure using the printed material;
    enclosing the at least a portion of the element at least partially within the first structure;
    forming a second structure adjacent the first structure, and enclosing at least a portion of the element at least partially within the second structure.

14. The method according to claim 13, wherein the element is a lace for an article of footwear, and wherein the lace extends continuously between the first structure and the second structure.

15. The method according to claim 13, wherein the nozzle is part of a 3D printer.

16. The method according to claim 13, wherein the printed material bonds to the surface of the article of apparel.

17. The method according to claim 13, wherein the printed material includes a thermoplastic material.

18. The method according to claim 13, wherein the article of apparel is an upper for an article of footwear.

* * * * *